(12) United States Patent
Busico et al.

(10) Patent No.: US 8,148,482 B2
(45) Date of Patent: Apr. 3, 2012

(54) TACTIC POLYMER POLYMERIZATION PROCESS USING CHIRAL CATALYSTS

(75) Inventors: Vincenzo Busico, Naples (IT); Harold W. Boone, Sugar Land, TX (US); James C. Stevens, Richmond, TX (US); Francesca Alfano, Naples (IT); Roberta Cipullo, Naples (IT)

(73) Assignee: Dow Global Technologies LLC, Midland, MI (US)

(*) Notice: Subject to any disclaimer, the term of this patent is extended or adjusted under 35 U.S.C. 154(b) by 95 days.

(21) Appl. No.: 12/598,833

(22) PCT Filed: May 1, 2008

(86) PCT No.: PCT/US2008/062188
§ 371 (c)(1),
(2), (4) Date: Apr. 9, 2010

(87) PCT Pub. No.: WO2008/137524
PCT Pub. Date: Nov. 13, 2008

(65) Prior Publication Data
US 2010/0222516 A1    Sep. 2, 2010

(30) Foreign Application Priority Data
May 2, 2007 (IT) .............................. MI2007A0878

(51) Int. Cl.
*C08F 4/64* (2006.01)
*C08F 4/642* (2006.01)
*C08F 297/08* (2006.01)

(52) U.S. Cl. ........ 526/113; 526/114; 526/144; 526/161; 526/165; 526/348; 525/245; 525/247

(58) Field of Classification Search .................. 526/113, 526/114, 144, 161, 165, 348
See application file for complete search history.

(56) References Cited

U.S. PATENT DOCUMENTS

| | | | |
|---|---|---|---|
| 5,470,993 A | 11/1995 | Devore et al. | |
| 5,866,704 A | 2/1999 | Nickias et al. | |
| 5,942,586 A | 8/1999 | Herrmann et al. | |
| 6,015,868 A | 1/2000 | Nickias et al. | |
| 6,034,022 A | 3/2000 | McAdon et al. | |
| 6,103,657 A | 8/2000 | Murray | |
| 6,150,297 A | 11/2000 | Campbell, Jr. et al. | |
| 6,268,444 B1 | 7/2001 | Klosin et al. | |
| 6,320,005 B1 | 11/2001 | Murray | |
| 6,515,155 B1 | 2/2003 | Klosin et al. | |
| 6,555,634 B1 | 4/2003 | Klosin et al. | |
| 6,953,764 B2 | 10/2005 | Frazier et al. | |
| 7,915,192 B2 * | 3/2011 | Arriola et al. ................. | 502/117 |
| 7,981,992 B2 * | 7/2011 | Arriola et al. ............... | 526/348.4 |
| 2003/0004286 A1 | 1/2003 | Klosin et al. | |
| 2003/0204017 A1 | 10/2003 | Stevens et al. | |
| 2004/0220050 A1 | 11/2004 | Frazier et al. | |
| 2007/0078222 A1 | 4/2007 | Chang et al. | |

FOREIGN PATENT DOCUMENTS

| | | |
|---|---|---|
| WO | WO-98/50392 | 11/1998 |
| WO | WO-02/02577 A1 | 1/2002 |
| WO | WO-0238628 | 5/2002 |
| WO | WO-02/092610 | 11/2002 |
| WO | WO-03/040195 | 5/2003 |
| WO | WO-03/078480 | 9/2003 |
| WO | WO-03/078483 | 9/2003 |
| WO | WO-2004099268 | 11/2004 |
| WO | WO-2005/090426 A1 | 9/2005 |
| WO | WO-2005/090427 A1 | 9/2005 |

OTHER PUBLICATIONS

Arriola et al., Science, 2006, p. 714-719, v312.
Bhriain et al., Macromolecules, 2005, p. 2056-2063, vol. 38.
Boussie et al., Angewandte Chemie Intl Edition, 2006, p. 3278-3283, vol. 45.
Brookhart et al., Journal of the American Chemical Society, 1995, p. 6414-6415, v117.
Busico et al., Angewandte Chemie Intl Edition, 2002, p. 505-508, vol. 41.
Busico et al., Israel J. Chem., 2002, p. 295-299, vol. 42.
Busico et al., Journal of the American Chemical Society, 2003, p. 5451-5460, v125.
Busico et al., Macromolecular Rapid Communication, 1999, p. 116-121, vol. 20.
Busico et al., Progress in Polymer Science, 2001, p. 443-533, vol. 26.
Chien et al., Journal of Polymer Science, Part A, Polymer Chemistry, 1999, p. 2439, vol. 37.
Chien et al., Macromolecules, 1997, p. 3447-3458, vol. 30.
Dias et al, Journal of Molecular Catalysis A: Chemical, 2002, p. 57-64, v185.
Feldman et al., Organometallics, 1997, p. 1514-1516, vol. 16.
Herberich et al., Organometallics, 1995, p. 471-480, vol. 14, issue1.
Johnson et al, Journal of the American Chemical Society, 1996, p. 267-268, v118.
Kaminski et al., Journal of Molecular Catalysis A: Chemical, 1995, p. 59-65, v102.
Lieber et al., Macromolecules, 2000, p. 9192-9199, v33.
Makio et al., Advanced Synthesis and Catalysis, 2002, p. 477-493, v344.
Przybyla et al., Acta Polymerica, 1999, p. 77-83, vol. 50.
Van Meurs et al., Journal of the American Chemical Society, 2005, p. 9913-9923, v127.
Zambelli et al, Macromolecules, 1988, p. 617-622, vol. 21.

* cited by examiner

*Primary Examiner* — Caixia Lu

(57) ABSTRACT

A process for forming tactic polymers employing at least one olefin polymerization catalyst comprising a non-racemic mixture of the R- and S-enantiomers of a metal complex containing at least one asymmetrically substituted (chiral) carbon atom, and a chain shuttling agent, a polar aprotic organic compound, or both a chain shuttling agent and a polar aprotic organic compound.

16 Claims, 2 Drawing Sheets

TACTIC POLYMER POLYMERIZATION PROCESS USING CHIRAL CATALYSTS

BACKGROUND OF THE INVENTION

The present invention relates to a process for preparing tactic polymers employing a chiral catalyst. The process is especially suited for preparing multiblock copolymers employing multiple catalysts and a compound known as a "chain shuttling agent" (CSA). Tactic polymers, especially isotactic olefin polymers including multi-block copolymers containing tactic polymer segments, and polymeric blends comprising the same are usefully employed in the preparation of solid articles such as moldings, films, sheets, and foamed objects by molding, extruding, or other processes, and are useful as components or ingredients in laminates, polymeric blends, and other end uses. Multi-block polymers comprise two or more differing regions or segments (blocks) differing in physical or chemical properties, such as crystallinity, tacticity, chain branching, and/or monomer insertion errors, thereby causing the polymer to possess unique physical properties. The resulting products are used in the manufacture of components for automobiles, such as profiles, bumpers and trim parts; packaging materials; electric cable insulation, adhesives, and other applications.

It is known in the art to prepare multi-block copolymers from one or more monomers by the use of chain shuttling agents under suitable polymerization techniques, especially continuous solution polymerization conditions at relatively high monomer conversions. Preferred processes employ two catalysts having differing comonomer incorporation properties and a chain shuttling agent such as organo aluminum or organo zinc compounds. Examples include WO2005/904025, WO2005/904026, and WO2005/904027, as well as *Science*, 312, 714-719 (2006).

In general, for the preparation of tactic polymers, including segments of multiblock copolymers, from $C_3$ and higher α-olefins, preferably propylene, one or more metal compounds containing an asymmetrically substituted tetravalent atom, especially carbon or silicon, are employed. Due to the presence of the asymmetrically substituted atomic center, two enantiomeric molecular forms, minor images of one another and identified as R- and S-enantiomers, exist. The tactic polymers prepared using an equal molar quantity of each enantiomer, referred to as a racemic mixture, differ in spatial orientation but possess identical bulk properties. However, multiblock copolymers made using enantiomeric mixtures comprise polymer segments formed from both enantiomers. This alternating monomer insertion orientation in the same polymer results in inversions in the polymer chain, which ultimately reduces the overall polymer tacticity. The higher the number of such inversions the greater is the loss of tactic properties of the polymers. The highest quantity of inversions will occur through the use of a racemic mixture of enantiomers. The presence of such inversions can interfere with crystal formation and decrease polymer properties such as heat resistance (as measured for example by melting point, Tm), crystallinity and modulus. Moreover, block length or molecular weight is often inferior as well. Finally, functionalization of tactic polymers involving chain termination using a functionalized chain terminating agent or other process can result in two enantiomeric forms of the functionalized polymer, one of which may be preferred for certain end use applications requiring chirality.

It would be desirable if there were provided an improved process for preparing tactic polymers, including multi-block copolymers comprising tactic polymer segments, especially linear multi-block copolymers of one or more $C_{3-10}$ α-olefins and/or mixtures of one or more $C_{3-10}$ α-olefins with ethylene and/or a conjugated or non-conjugated $C_{4-20}$ diene, by the use of a shuttling agent under chain shuttling polymerization conditions, characterized by an improvement in one or more of the foregoing properties. It would also be desirable to provide such an improved process that is capable of preparing multi-block copolymers, especially linear multi-block copolymers of $C_{3-20}$ α-olefins, having increased molecular weight and longer segment lengths. Moreover, the preparation of tactic polymers using a single enantiomer of a metal complex in a high yield process is desirable as well. Finally, it would be desirable to provide an improved process for preparing any of the foregoing desirable polymer products in a highly productive, continuous solution polymerization process.

SUMMARY OF THE INVENTION

In one embodiment of the present invention there is now provided a process for forming a high molecular weight, multi-block copolymer, said copolymer containing therein two or more chemically distinguishable segments or blocks, at least one of which comprises a tactic polymer, the process comprising polymerizing one or more olefin monomers, at least one of which is capable of forming a tactic polymer, in the presence of a chain shuttling agent and a catalyst composition comprising:

two or more olefin polymerization catalysts capable of preparing polymers having differing chemical or physical properties under equivalent polymerization conditions, or at least one olefin polymerization catalyst containing multiple active catalyst sites capable of preparing polymers having differing chemical or physical properties;

characterized in that at least one of the olefin polymerization catalysts comprises a metal complex containing at least one asymmetrically substituted (chiral) carbon atom, said metal complex being present in the form of a non-racemic mixture of the R- and S-enantiomers thereof, preferably in the form of the substantially pure R- or S-enantiomer thereof. Desirably, the foregoing process is conducted in the presence of a polar, aprotic, organic liquid compound having a dielectric constant greater than 2.4, preferably greater than or equal to 2.8, most preferably greater than or equal to 3.0

In another embodiment of the present invention, there is provided a process for forming a high molecular weight, tactic polymer, the process comprising polymerizing one or more olefin monomers, at least one of which is capable of forming a tactic polymer in the presence of a chain shuttling agent and a catalyst composition comprising a metal complex containing multiple active catalyst sites capable of preparing polymers having differing chemical or physical properties, characterized in that the metal complex contains at least one asymmetrically substituted carbon atom, said metal complex being present in the form of a non-racemic mixture of the R- or S-enantiomers thereof. Desirably, the foregoing process is conducted in the presence of a polar, aprotic, organic liquid compound having a dielectric constant greater than 2.4, preferably greater than or equal to 2.8, most preferably greater than or equal to 3.0.

In yet another embodiment of the present invention there is provided a process for forming a high molecular weight, tactic polymer, the process comprising polymerizing one or more olefin monomers, at least one of which is capable of forming a tactic polymer, said process being conducted in the presence of a catalyst composition comprising a metal complex containing at least one asymmetrically substituted carbon atom, said metal complex being present in the form of a non-racemic mixture of the R- or S-enantiomers thereof and in the further presence of a polar, aprotic, organic liquid compound having a dielectric constant greater than 2.4, preferably greater than or equal to 2.8, most preferably greater than or equal to 3.0. In a most preferred mode of this embodiment, the non-racemic mixture consists essentially, substantially entirely, or entirely of either the R- or the S-enantiomer.

Metal complexes containing a chiral center exist in two enantiomeric forms, identified as the R- or S-enantiomer. Under polymerization conditions, each enantiomer polymerizes a $C_{3-20}$ α-olefin, especially propene, from a different enantioface, and both catalyst enantiomers produce polymer having an isotactic stereostructure. However, in the presence of a shuttling agent, mixtures of the R- and S-enantiomers, give multi-block copolymers in which the inversions or separations between polymer segments reduce the crystalline properties of the tactic polymer. By using either the R- or S-enantiomer, or by at least increasing the concentration of one of the enantiomers in the catalyst mixture (a non-racemic mixture), the inversions in the resulting polymer can be eliminated or at least reduced, resulting in longer, defect free polymer blocks or segments.

Preferably, the foregoing process takes the form of a continuous solution process for forming the tactic polymer, including multi-block copolymers comprising tactic polymer segments, preferably linear, multi-block copolymers, at least one of the monomers employed being a $C_{3-20}$ olefin, preferably propylene, 1-butene, or 4-methyl-1-pentene using multiple catalysts or a single catalyst containing multiple active sites under the foregoing polymerization conditions. Under continuous solution polymerization conditions, especially at high monomer conversion, shuttling from the chain shuttling agent to only one of the enantiomeric forms of the catalyst reduces polymer defects and increases polymer crystallinity, modulus, and temperature resistance properties. When conducted in the presence of a polar aprotic solvent, the formation of tactic polymers according to any of the foregoing embodiments of the invention and especially those employing a chain shuttling agent, is improved in efficiency compared to the use of non-polar solvents.

DETAILED DESCRIPTION OF THE INVENTION

Figure 1:
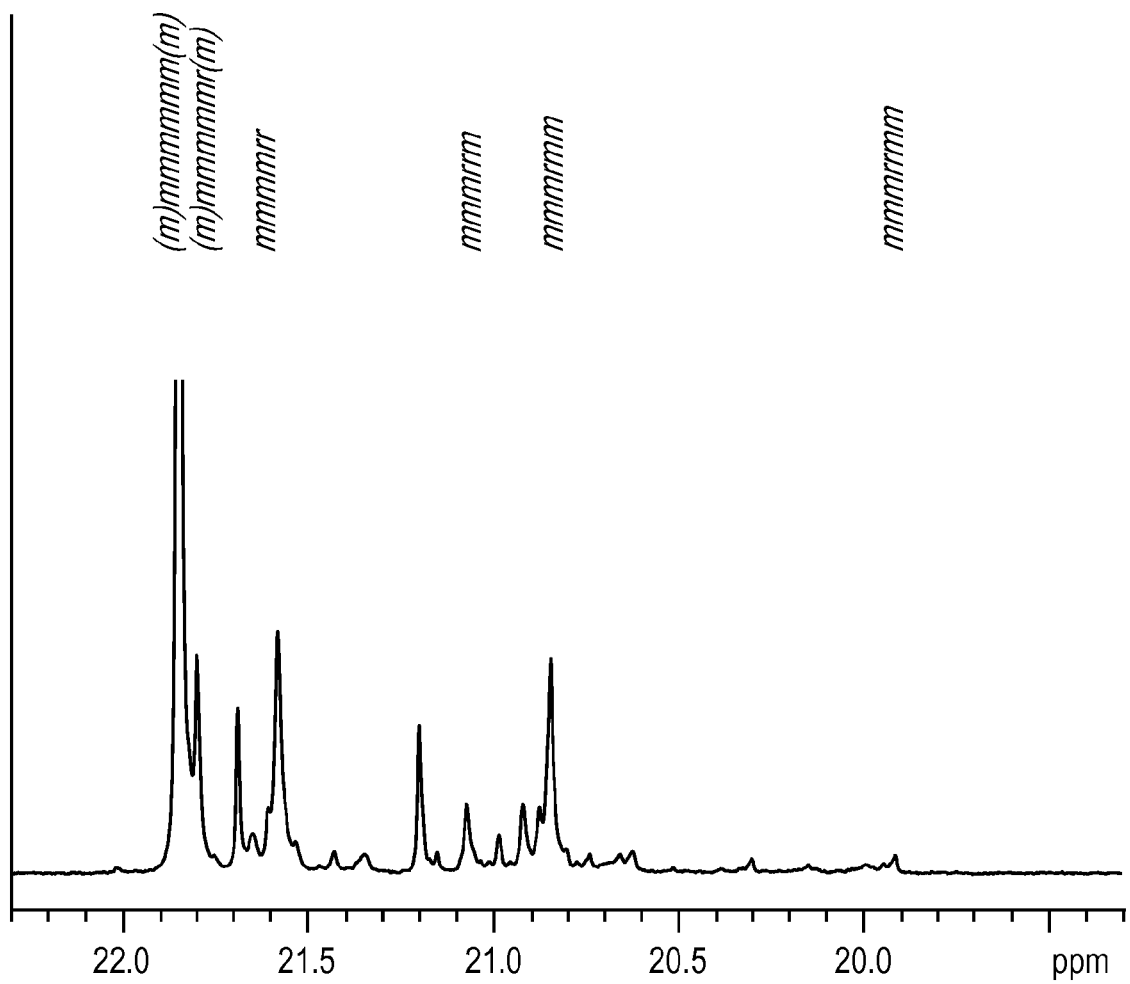
FIG. 1 is the $^{13}C$ NMR spectrum of polymer prepared according to comparative A.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date hereof. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

The term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "polymer", includes both conventional homopolymers, that is, homogeneous polymers prepared from a single monomer, and copolymers (interchangeably referred to herein as interpolymers), meaning polymers prepared by reaction of at least two monomers or otherwise containing chemically differentiated segments or blocks therein even if formed from a single monomer. More specifically, the term "polyethylene" includes homopolymers of ethylene and copolymers of ethylene and one or more $C_{3-8}$ α-olefins in which ethylene comprises at least 50 mole percent. The term "propylene copolymer" or "propylene interpolymer" means a copolymer comprising propylene and optionally one or more copolymerizable comonomers, wherein propylene comprises a plurality of the polymerized monomer units of at least one block or segment in the polymer (the crystalline block), preferably at least 90 mole percent, more preferably at least 95 mole percent, and most preferably at least 98 mole percent. A polymer made primarily from a different α-olefin, such as 4-methyl-1-pentene would be named similarly. The term "crystalline" if employed, refers to a polymer or polymer block that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point or to one having a heat of fusion ($\Delta H_f$) less than 1 J/g as determined by DSC as described here-in-after. The term, "isotactic" or "syndiotactic" is defined as polymer repeat units having at least 70 percent isotactic or syndiotactic pentads as determined by $^{13}$C-NMR analysis. "Highly isotactic" or "highly syndiotactic" is defined as polymer blocks having at least 90 percent isotactic or syndiotactic pentads. The term "tactic" is defined as polymer repeat units that are either isotactic or syndiotactic and the term "highly tactic" refers to polymer repeat units that are either highly isotactic or highly syndiotactic.

The term "multi-block copolymer" or "segmented copolymer" refers to a polymer comprising two or more chemically distinct regions or segments (referred to as "blocks") preferably joined in a linear manner (linear multi-block copolymer), that is, a polymer comprising chemically differentiated units which are joined end-to-end with respect to polymerized ethylenic functionality, rather than in pendent or grafted fashion.

Suitable olefin monomers for use in the present invention include linear and cyclic compounds containing one or more ethylenic unsaturations that are capable of polymerization or copolymerization using coordination polymerization catalysts. The present process is ideally suited for the polymerization of a single $C_{3-20}$ olefin, especially propylene, as well as the polymerization of one or more $C_{3-20}$ α-olefins with ethylene, especially propylene and ethylene, or for the polymerization of one or more $C_{3-20}$ α-olefins in combination with one or more $C_{4-20}$ cycloolefins or diolefins, and optionally ethylene. Suitable monomers for use according to the present invention preferably include propylene, 1-butene, and 4-methyl-1-pentene and optionally ethylene and/or one or more copolymerizable ethylenically unsaturated compounds, especially a conjugated or non-conjugated diene, provided that the object of the invention, preparation of tactic polymers, especially multi-block copolymers containing blocks of differing chemical properties including at least one polymer block having increased tacticity, is obtained.

Examples of suitable monomers for use herein include ethylene and straight-chain or branched α-olefins of 3 to 20, preferably 3 to 8 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20 carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; diolefins and multi-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene; aromatic vinyl compounds such as mono or polyalkylstyrenes (including styrene, o-methylstyrene, m-methylstyrene, p-methylstyrene, o,p-dimethylstyrene, o-ethylstyrene, m-ethylstyrene and p-ethylstyrene), and functional group-containing derivatives, such as methoxystyrene, ethoxystyrene, vinylbenzoic acid, methyl vinylbenzoate, vinylbenzyl acetate, hydroxystyrene, o-chlorostyrene, p-chlorostyrene, divinylbenzene, 3-phenylpropene, 4-phenylpropene, α-methylstyrene, vinylchloride, 1,2-difluoro-ethylene, 1,2-dichloroethylene, tetrafluoroethylene, and 3,3,3-trifluoro-1-propene.

Highly preferably the multi-block copolymer prepared according to the present process possesses a molecular weight distribution, Mw/Mn, of less than 3.0, preferably less than 2.5, most preferably less than 2.0. In some embodiments of the invention some of the blocks are crystalline while others are amorphous, for example blocks of isotactic polypropylene and blocks of a propylene/ethylene copolymer. In other embodiments of the invention some of the blocks are tactic, especially isotactic, more preferably highly isotactic, and others are atactic. In still other embodiments of the invention, some blocks are highly regular, isotactic polypropylene and other blocks contain irregularities, especially blocks comprising polypropylene containing regio-irregular monomer insertions which are 3,1-insertions, leading to chain straightening of the resulting polymer. The resulting blocks are relatively amorphous, compared to the tactic polypropylene blocks. By use of the present invention, the block length of the various polymer segments, especially the tactic polymer segments can be increased.

The difference in various monomer addition geometries herein is illustrated by the following diagram using propylene as a representative monomer, with the active catalyst site designated as Cat and the previously formed polymer chain designated by Polymer.

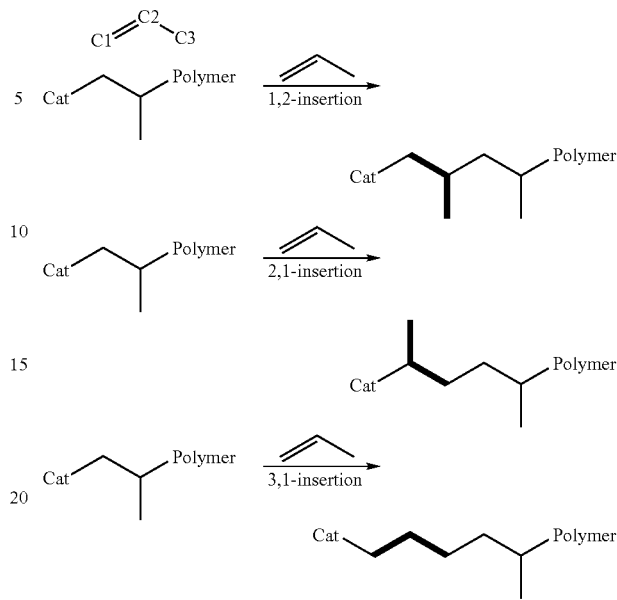

Because the respective distinguishable segments or blocks are joined into single polymer chains, the polymer cannot be completely fractionated using standard selective extraction techniques. For example, polymers containing regions that are isotactic polypropylene and regions or blocks that are propylene/ethylene copolymers or polymers with highly tactic blocks and blocks containing regio-irregular 2,1- or 3,1-monomer insertion cannot be selectively extracted or completely fractionated using differing solvents. In a preferred embodiment the $^{13}C$ NMR peaks corresponding to a regio-error at about 14.6 and about 15.7 ppm are the result of 2,1-insertions of propylene units into the growing polymer chain. These peaks are of about equal intensity, and they represent from 0.01-7, preferably 0.01 to 2 mole percent of the propylene insertions into the homopolymer or copolymer chain. Regio-errors are calculated as one half of the sum of the two of methyls showing up at 14.6 and 15.7 ppm, divided by the total methyls at 14-22 ppm. In a preferred embodiment the quantity of extractable polymer using either a dialkyl ether- or an alkane-solvent is less than 10 percent, preferably less than 7 percent, more preferably less than 5 percent and most preferably less than 2 percent of the total polymer weight.

As used herein with respect to a chemical compound, unless specifically indicated otherwise, the singular includes all isomeric forms and vice versa (for example, "hexane", includes all isomers of hexane individually or collectively). The terms "compound" and "complex" are used interchangeably herein to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge.

The term, "hydrocarbyl" refers to univalent substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. "Substituted hydrocarbyl" refers to a hydrocarbyl group that is substituted with one or more nonhydrocarbyl substituent groups. The terms, "heteroatom containing hydrocarbyl" or "heterohydrocarbyl" refer to univalent groups in which at least one atom other than hydrogen or carbon is present along with one or more carbon atom and one or more hydrogen atoms. The term "heterocarbyl" refers to groups containing one or more carbon atoms and one or more heteroatoms and no hydrogen atoms. The bond between the carbon atom and any heteroatom as well as the bonds between any two heteroatoms, may be a single or multiple covalent bond or a coordinating or other donative bond. Thus, an alkyl group substituted with a heterocycloalkyl-, aryl-substituted heterocycloalkyl-, heteroaryl-, alkyl-substituted heteroaryl-, alkoxy-, aryloxy-, dihydrocarbylboryl-, dihydrocarbylphosphino-, dihydrocarbylamino-, trihydrocarbylsilyl-, hydrocarbylthio-, or hydrocarbylselenogroup is within the scope of the term heteroalkyl. Examples of suitable heteroalkyl groups include cyanomethyl-, benzoylmethyl-, (2-pyridyl)methyl-, and trifluoromethyl-groups.

As used herein the term "aromatic" refers to a polyatomic, cyclic, conjugated ring system containing (4δ+2) π-electrons, wherein 6 is an integer greater than or equal to 1. The term "fused" as used herein with respect to a ring system containing two or more polyatomic, cyclic rings means that with respect to at least two rings thereof, at least one pair of adjacent atoms is included in both rings. The term "aryl" refers to a monovalent aromatic substituent which may be a single aromatic ring or multiple aromatic rings which are fused together, linked covalently, or linked to a common group such as a methylene or ethylene moiety. Examples of aromatic ring(s) include phenyl, naphthyl, anthracenyl, and biphenyl, among others.

"Substituted aryl" refers to an aryl group in which one or more hydrogen atoms bound to any carbon is replaced by one or more functional groups such as alkyl, substituted alkyl, cycloalkyl, substituted cycloalkyl, heterocycloalkyl, substituted heterocycloalkyl, halogen, alkylhalos (for example, $CF_3$), hydroxy, amino, phosphido, alkoxy, amino, thio, nitro, and both saturated and unsaturated cyclic hydrocarbons which are fused to the aromatic ring(s), linked covalently or linked to a common group such as a methylene or ethylene moiety. The common linking group may also be a carbonyl as in benzophenone or oxygen as in diphenylether or nitrogen in diphenylamine.

The term, "shuttling agent" refers to a compound that is capable of causing polymeryl exchange between at least two different active catalyst sites of the catalyst or catalysts included in the composition under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. Preferably, the shuttling agent has an activity ratio $R_{A-B}/R_{B-A}$ of from 0.01 and 100, more preferably from 0.1 to 10, most preferably from 0.5 to 2.0, and most highly preferably from 0.8 to 1.2, wherein $R_{A-B}$ is the rate of polymeryl transfer from catalyst A active site to catalyst B active site via the shuttling agent, and $R_{B-A}$ is the rate of reverse polymeryl transfer, that is, the rate of exchange starting from the catalyst B active site to catalyst A active site via the shuttling agent. Desirably, the intermediate formed between the shuttling agent and the polymeryl chain is sufficiently stable that chain termination is relatively rare. Desirably, less than 90 percent, preferably less than 75 percent, more preferably less than 50 percent and most desirably less than 10 percent of shuttle-polymeryl products are terminated prior to attaining 3 distinguishable polymer segments or blocks. Ideally, the rate of chain shuttling (defined by the time required to transfer a polymer chain from a catalyst site to the chain shuttling agent and then back to a catalyst site) is equivalent to or faster than the rate of polymer termination, even up to 10 or even greater than or equal to 100 times faster than the rate of polymer termination. This permits polymer block formation on the same time scale as polymer propagation.

By selecting different combinations of catalysts having differing polymerization ability, and by pairing various shuttling agents or mixtures of agents with these catalyst combinations, polymer products having segments of different properties, different block lengths, and different numbers of such segments or blocks in each copolymer can be prepared. For example, if the activity of the shuttling agent is low relative to the catalyst polymer chain propagation rate of one or more of the catalysts, longer block length multi-block copolymers and polymer blends may be obtained. Contrariwise, if shuttling is very fast relative to polymer chain propagation, a copolymer having a more random chain structure and shorter block lengths is obtained. An extremely fast shuttling agent may produce a multi-block copolymer having substantially random copolymer properties. By proper selection of both catalyst mixture and shuttling agent, relatively pure block copolymers, copolymers containing relatively large polymer segments or blocks, and/or blends of the foregoing with various homopolymers and/or copolymers can be obtained.

The polymerization is preferably conducted in the presence of a solvent (solution polymerization conditions). Suitable solvents for the polymerization include aliphatic and aromatic hydrocarbons and heteroatom substituted derivatives thereof. Examples include $C_{4-20}$ aliphatic, cycloaliphatic or aromatic hydrocarbons and mixtures thereof, especially hexane, heptane or mixtures thereof. As previously disclosed, it has been discovered that use of a polar, aprotic solvent, especially a non-coordinating solvent, results in improved efficiency of tactic polymer formation and the preparation of higher molecular weight multi-block copolymers, especially using monomers comprising compounds having 3 or more carbons, such as propylene. This is believed to be due to increased stability of the metal complex/polymeryl ligand intermediate which reduces premature polymer termination. Moreover, when a non-racemic chiral metal complex is utilized, especially the substantially pure R- or S-enantiomer, the use of a polar aprotic solvent beneficially increases the catalyst stability, allowing improved catalyst lifetimes.

As used herein the term "substantially pure" means 75 percent or greater purity, preferably 90 percent or greater purity, most preferably 95 percent or greater purity. As used herein, the term "noncoordinating" means a substance (solvent, anion, cocatalyst or cocatalyst remnant) which either does not coordinate to the catalyst precursor and the active catalytic species derived therefrom, or which is only weakly coordinated to such complexes or species, thereby remaining sufficiently labile to be displaced by a neutral Lewis base, such as an olefin. Desirably, the material is also non-interfering with any polymeryl exchange between the chain shuttling agent and the polymer chain and stabilizes the resulting polymeryl-chain transfer agent species. Suitable non-coordinating, polar, aprotic solvents are compounds having sufficient polarity to help in stabilizing the intermediate shuttling agent/polymeryl ligand pair, but not sufficiently polar to adversely affect the polymerization process or the formation of an active coordination polymerization catalyst or else they contain bulky substituents that prevent coordination with the active catalyst species.

For the purposes of this invention, the values for dielectric constants are those measured at 20° C. The dielectric constant of a substance is a relative measure of its polarity. It is represented by the term, $\varepsilon_r$, defined as:

$$\varepsilon_r = \frac{\varepsilon_s}{\varepsilon_o}$$

where $\varepsilon_s$ is the static permittivity of the material, and $\varepsilon_o$ is vacuum permittivity. Vacuum permittivity is derived from Maxwell's equations by relating the electric field intensity E to the electric flux density D. In vacuum (free space), the permittivity $\varepsilon$ is $\varepsilon_o$, and $\varepsilon_r$ equals 1.

The relative dielectric constant $\varepsilon_r$ can be measured for static electric fields as follows: first the capacitance of a test capacitor $C_0$ is measured with vacuum between its plates. Then, the substance to be measured is placed between the plates of the capacitor and the capacitance, $C_x$ is measured. The relative dielectric constant can be then calculated as:

$$\varepsilon_r = \frac{C_x}{C_o}$$

While not wishing to be held to any particular theory of operation, it is believed that polar, aprotic liquids help in stabilizing the presumed 4-center intermediate formed between the shuttling agent and the active catalyst, without adversely affecting the polymerization process or preventing polymerization from taking place. Additionally, it is believed that the use of solvents having relatively elevated polarity weaken the interaction of the active catalyst site(s) with counterions resulting from the activation process, leading to an increased relative rate of chain shuttling. Preferred solvents for use herein possess a dielectric constant from 2.5 to 50, more preferably from 2.8 to 25 and most preferably from 3.0 to 20.

Examples of suitable polar, aprotic solvents include hydrocarbons, especially o-xylene, ethylbenzene, 1,2,3-trimethylbenzene, 1,2,4-trimethylbenzene, 1,3,5-trimethylbenzene, isopropylbenzene, 1-methyl-2-ethylbenzene, and 1,2-diethylbenzene, as well as heteroatom containing compounds, including chlorobenzene, o-dichlorobenzene, chlorotoluene, 1-chloroethane, dichloromethane, 1,2-dichloroethane, 1-chloroethene, 1-chloropropane, 1,1-dichloroethane, 1-chlorobutane, 1-chloropentane, 1-chlorohexane, 1,1,1-trifluoroethane, difluoromethane, trifluoromethane, 1,1-difluoroethane, 1,1,1-trifluororethane, 1,1,1,2-tetrafluoroethane, 1,1,1-trifluoropropane, 1,1,1-trifluorobutane, 1,1,1-trifluoropentane, 1,1,1-trifluorohexane, 1,1,1,3,3-pentafluoropropane, 1,1,1,3,3-pentafluorobutane, fluorocyclobutane, difluorocyclobutane, trifluorocyclobutane, pentafluorocyclobutane, fluorocyclohexane, 1,2-difluorocyclohexane, 1,3-difluorocyclohexane, fluorobenzene, o-difluorobenzene, m-difluorobenzene, p-difluorobenzene, fluorotoluene, difluorotoluene, 1-chloro-1-fluoroethane, 1,2-dichlorofluororethane, dichlorofluoromethane, difluorochloromethane, 2-trifluoromethylpropane, tetrahydrofuran, methyl t-butyl ether, 2-butanone, diethylether, 1,2-dimethoxyethane, ethylene glycol dibutyl ether; diethylene glycol dimethyl ether, diethylene glycol dibutyl ether, dichloromethane, 1,4-dioxane, chloroform, sulfolane, dimethylformamide, and dimethylether.

Mixtures of the foregoing polar, aprotic compounds may be employed as well as mixtures of one or more polar, aprotic compounds with one or more non- or less-polar, aprotic, organic compounds, such as one or more compounds having a dielectric constant less than 2.4.

Highly desirably, multi-block copolymers prepared according to the present invention have an average number of blocks or segments per chain (as defined as the average number of blocks of different composition divided by the Mn of the polymer) greater than 3.0 more preferably greater than 3.5, even more preferably greater than 4.0, and less than 25, preferably less than 15, more preferably less than 10.0, most preferably less than 8.0. Mw and Mn for the purposes of this invention is determined using gel permeation chromatography (GPC) as elaborated here-in-after.

Suitable shuttling agents for use herein include Group 1, 2, 12 or 13 metal compounds or complexes containing at least one $C_{1-20}$ hydrocarbyl group, preferably hydrocarbyl substituted aluminum, gallium or zinc compounds containing from 1 to 12 carbons in each hydrocarbyl group, and reaction products thereof with a proton source. Preferred hydrocarbyl groups are alkyl groups, preferably linear or branched, $C_{2-8}$ alkyl groups. Most preferred shuttling agents for use in the present invention are trialkyl aluminum compounds having from 1 to 8 carbons in each alkyl group. Examples include: triethylaluminum, tri(i-propyl) aluminum, tri(i-butyl) aluminum, tri(n-hexyl) aluminum, tri(n-octyl) aluminum, triethyl gallium, diethyl zinc, diisobutyl zinc and dioctyl zinc. Additional suitable shuttling agents include the reaction product or mixture formed by combining the foregoing organometal compound, preferably a tri($C_{1-8}$) alkyl aluminum or di($C_{1-8}$) alkyl zinc compound with less than a stoichiometric quantity (relative to the number of hydrocarbyl groups) of a secondary amine or a hydroxyl compound, especially bis(trimethylsilyl) amine, t-butyl(dimethyl)siloxane, 2-hydroxymethylpyridine, di(n-pentyl)amine, 2,6-di(t-butyl)phenol, ethyl(1-naphthyl) amine, bis(2,3,6,7-dibenzo-1-azacycloheptaneamine), or 2,6-diphenylphenol. Desirably, sufficient amine or hydroxyl reagent is used such that one hydrocarbyl group remains per metal atom. The primary reaction products of the foregoing combinations most desired for use in the present invention as shuttling agents are n-octylaluminum di(bis(trimethylsilyl) amide), i-propylaluminum bis(dimethyl(t-butyl)siloxide), and n-octylaluminum di(pyridinyl-2-methoxide), i-butylaluminum bis(dimethyl(t-butyl)siloxane), i-butylaluminum bis (di(trimethylsilyl)amide), n-octylaluminum di(pyridine-2-methoxide), i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis (dimethyl(t-butyl)siloxide, ethylzinc (2,6-diphenylphenoxide), and ethylzinc (t-butoxide). Especially preferred shuttling agents are trimethyl aluminum, triethyl aluminum and tri i-propyl aluminum.

It will be appreciated by the skilled artisan that a suitable shuttling agent for one catalyst or catalyst combination may not necessarily be as good or even satisfactory for use with a different catalyst or catalyst combination. Some potential shuttling agents may adversely affect the performance of one or more catalysts and may be undesirable for use for that reason as well. Accordingly, the activity of the chain shuttling agent desirably is balanced with the catalytic activity of the catalysts to achieve the desired polymer properties. In some embodiments of the invention, best results may be obtained by use of shuttling agents having a chain shuttling activity (as measured by the average number of blocks per number average molecular weight (Mn) polymer chain) that is less than is possible using more active chain shuttling agents.

Generally however, preferred shuttling agents possess the highest rates of reversible polymer transfer as well as the highest transfer efficiencies (reduced incidences of chain termination). Such shuttling agents may be used in reduced reactor concentrations and still achieve the desired degree of shuttling. In addition, such shuttling agents result in production of relatively shorter polymer block lengths and/or more blocks per average polymer chain. Highly desirably, chain shuttling agents with a single exchange site are employed due to the fact that the effective molecular weight of the polymer in the reactor is lowered, thereby reducing viscosity of the reaction mixture and consequently reducing operating costs. For the purposes of this invention, the term "single exchange site" refers to a chain shuttling agent that, during the chain shuttling polymerization reaction, has a single alkyl or polymeryl group that can reversibly exchange with growing polymeryl groups on the active polymerization catalyst species. For example, diethyl zinc has two exchange sites, presumably giving dipolymerylzinc during the exchange process. An example of a single exchange site chain shuttling agent would be EtZn-L, where L is a ligand that is not exchanged, yet does not block the reversible exchange of the remaining polymeryl group.

Suitable catalysts for use herein include any compound or combination of compounds that is adapted for preparing polymers of the desired composition or type. Both heterogeneous and homogeneous catalysts may be employed. Examples of heterogeneous catalysts include the well known Ziegler-Natta compositions, especially Group 4 metal halides supported on Group 2 metal halides or mixed halides and alkoxides and the well known chromium or vanadium based catalysts. Preferably however, for ease of use and for production of narrow molecular weight polymer segments in solution, the catalysts for use herein are homogeneous catalysts comprising a relatively pure organometallic compound or metal complex, especially compounds or complexes based on metals selected from Groups 3-10 or the Lanthanide series of the Periodic Table of the Elements. It is preferred that any catalyst employed herein, not significantly detrimentally affect the performance of the other catalyst under the conditions of the present polymerization. Desirably, no catalyst is reduced in activity by greater than 25 percent, more preferably greater than 10 percent under the conditions of the present polymerization.

The skilled artisan will appreciate that any metal complex lacking in a chiral atomic center will be employed in the present invention only in those embodiments employing multiple catalysts.

By catalyst activity reduction, it is meant that it is desirable that the presence of a second (or more) catalyst species in the reactor does not reduce the catalytic efficiency of the other catalyst species. This can be determined, for example, by independently evaluating each catalyst species in the absence of the other(s), under the same conditions of stirring, temperature, solvent, monomer type and concentrations, and in the absence of chain shuttling agents. The activity of each catalyst as run independently of other catalysts can then be compared to the case where the catalysts are combined in the reactor under the same conditions of stifling, temperature, solvent, monomer type and concentrations, and in the absence of chain shuttling agents. In this case, the products of each type of catalyst species can generally be separated by some procedure and quantified. For example, in the absence of a chain shuttling agent, the product resulting from the use of two distinct catalysts often results in a bimodal molecular weight distribution, which can be evaluated using standard GPC techniques and the amount of each component quantified using standard deconvolution techniques which are well known in the art. If two hypothetical transition metal containing catalysts, Catalyst A and Catalyst B, were determined to have a catalyst activity of 100,000 gram polymer per gram of transition metal added to the reactor and 200,000 gram polymer per gram of transition metal added to the reactor respectively when run independently, and 100,000 g/g and 180,000 g/g respectively when run together, Catalyst A will have reduced the activity of Catalyst B by 10 percent.

Suitable metal complexes for use herein include complexes of transition metals selected from Groups 3 to 15 of the Periodic Table of the Elements containing one or more delocalized, π-bonded ligands or Lewis base ligands. Examples include metallocene, half-metallocene, constrained geometry, and pyridylamine, or other multidentate base complexes. The complexes are generically depicted by the formula: $MK_kX_xZ_z$, or a dimer thereof, wherein M is a metal selected from Groups 3-15, preferably 3-10, more preferably 4-8, and most preferably Group 4 of the Periodic Table of the Elements;

K independently each occurrence is a group containing delocalized t-electrons or one or more electron pairs through which K is bound to M, said K group containing up to 50 atoms not counting hydrogen atoms, optionally two or more K groups may be joined together forming a bridged structure, and further optionally one or more K groups may be bound to Z, to X or to both Z and X;

X independently each occurrence is a monovalent, anionic moiety having up to 40 non-hydrogen atoms, optionally one or more X groups may be bonded together thereby forming a divalent or polyvalent anionic group, and, further optionally, one or more X groups and one or more Z groups may be bonded together thereby forming a moiety that is bound to M in a polydentate fashion with formally anionic and formally neutral donor atoms;

Z independently each occurrence is a neutral, Lewis base donor ligand of up to 50 non-hydrogen atoms containing at least one electron pair through which Z is coordinated to M;

k is an integer from 0 to 3;

x is an integer from 1 to 4;

z is a number from 0 to 3; and the sum, k+x, is equal to the formal oxidation state of M.

Suitable metal complexes include those containing from 1 to 3π-bonded anionic or neutral ligand groups, which may be cyclic or non-cyclic delocalized π-bonded anionic ligand groups. Exemplary of such π-bonded groups are conjugated or nonconjugated, cyclic or non-cyclic diene and dienyl groups, allyl groups, boratabenzene groups, phosphole, and arene groups. By the term "π-bonded" is meant that the ligand group is bonded to the transition metal by a sharing of electrons from a partially delocalized π-bond.

Each atom in the delocalized π-bonded group may independently be substituted with a radical selected from the group consisting of hydrogen, halogen, hydrocarbyl, halohydrocarbyl, hydrocarbyl-substituted heteroatoms wherein the heteroatom is selected from Group 14-16 of the Periodic Table of the Elements, and such hydrocarbyl-substituted heteroatom radicals further substituted with a Group 15 or 16 hetero atom containing moiety. In addition two or more such radicals may together form a fused ring system, including partially or fully hydrogenated fused ring systems, or they may form a metallocycle with the metal. Included within the term "hydrocarbyl" are $C_{1-20}$ straight, branched and cyclic alkyl radicals, $C_{6-20}$ aromatic radicals, $C_{7-20}$ alkyl-substituted aromatic radicals, and $C_{7-20}$ aryl-substituted alkyl radicals.

Suitable hydrocarbyl-substituted heteroatom radicals include mono-, di- and tri-substituted radicals of boron, silicon, germanium, nitrogen, phosphorus or oxygen wherein each of the hydrocarbyl groups contains from 1 to 20 carbon atoms. Examples include N,N-dimethylamino, pyrrolidinyl, trimethylsilyl, triethylsilyl, t-butyldimethylsilyl, methyldi(t-butyl)silyl, triphenylgermyl, and trimethylgermyl groups. Examples of Group 15 or 16 hetero atom containing moieties include amino, phosphino, alkoxy, or alkylthio moieties or divalent derivatives thereof, for example, amide, phosphide, alkyleneoxy or alkylenethio groups bonded to the transition metal or Lanthanide metal, and bonded to the hydrocarbyl group, π-bonded group, or hydrocarbyl-substituted heteroatom.

Examples of suitable anionic, delocalized π-bonded groups include cyclopentadienyl, indenyl, fluorenyl, tetrahydroindenyl, tetrahydrofluorenyl, octahydrofluorenyl, pentadienyl, cyclohexadienyl, dihydroanthracenyl, hexahydroanthracenyl, decahydroanthracenyl groups, phosphole, and boratabenzyl groups, as well as inertly substituted derivatives thereof, especially $C_{1-10}$ hydrocarbyl-substituted or tris($C_1$-$C_{10}$ hydrocarbyl)silyl-substituted derivatives thereof. By "inertly substituted derivative" it is meant that the substituent does not contain reactive functionality that irreversibly reacts with any catalyst or cocatalyst component or chain shuttling agent in the catalyst system to destroy catalyst activity. Preferred anionic delocalized π-bonded groups are cyclopentadienyl, pentamethylcyclopentadienyl, tetramethylcyclopentadienyl, tetramethylsilylcyclopentadienyl, indenyl, 2,3-dimethylindenyl, fluorenyl, 2-methylindenyl, 2-methyl-4-phenylindenyl, tetrahydrofluorenyl, octahydrofluorenyl, 1-indacenyl, 3-pyrrolidinoinden-1-yl, 3,4-(cyclopenta(l)phenanthren-1-yl, and tetrahydroindenyl.

The boratabenzyl ligands are anionic ligands which are boron containing analogues to benzene. They are previously known in the art having been described by G. Herberich, et al., in *Organometallics*, 14, 1, 471-480 (1995). Preferred boratabenzyl ligands correspond to the formula:

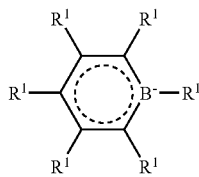

wherein $R^1$ is an inert substituent, preferably selected from the group consisting of hydrogen, hydrocarbyl, silyl, halo or germyl, said $R^1$ having up to 20 atoms not counting hydrogen, and optionally two adjacent $R^1$ groups may be joined together. In complexes involving divalent derivatives of such delocalized π-bonded groups one atom thereof is bonded by means of a covalent bond or a covalently bonded divalent group to another atom of the complex thereby forming a bridged system.

Phospholes are anionic ligands that are phosphorus containing analogues to a cyclopentadienyl group. They are previously known in the art having been described by WO 98/50392, and elsewhere. Preferred phosphole ligands correspond to the formula:

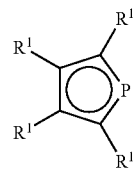

wherein $R^1$ is as previously defined.

Preferred transition metal complexes for use herein correspond to the formula: $MK_kX_xZ_z$, or a dimer thereof, wherein:

M is a Group 4 metal;

K is a group containing delocalized t-electrons through which K is bound to M, said K group containing up to 50 atoms not counting hydrogen atoms, optionally two K groups may be joined together forming a bridged structure, and further optionally one K may be bound to X or Z;

X independently each occurrence is a monovalent, anionic moiety having up to 40 non-hydrogen atoms, optionally one or more X and one or more K groups are bonded together to form a metallocycle, and further optionally one or more X and one or more Z groups are bonded together thereby forming a moiety that is bound to M in a polydentate fashion with formally anionic and formally neutral donor atoms;

Z independently each occurrence is a neutral, Lewis base donor ligand of up to 50 non-hydrogen atoms containing at least one unshared electron pair through which Z is coordinated to M;

k is an integer from 0 to 3;

x is an integer from 1 to 4;

z is a number from 0 to 3; and the sum, k+x, is equal to the formal oxidation state of M.

Preferred complexes include those containing either one or two K groups. The latter complexes include those containing a bridging group linking the two K groups. Preferred bridging groups are those corresponding to the formula $(ER'_2)_e$ wherein E is silicon, germanium, tin, or carbon, R' independently each occurrence is hydrogen or a group selected from silyl, hydrocarbyl, hydrocarbyloxy and combinations thereof, said R' having up to 30 carbon or silicon atoms, and e is 1 to 8. Preferably, R' independently each occurrence is methyl, ethyl, propyl, benzyl, tert-butyl, phenyl, methoxy, ethoxy or phenoxy.

Examples of the complexes containing two K groups are compounds corresponding to the formula:

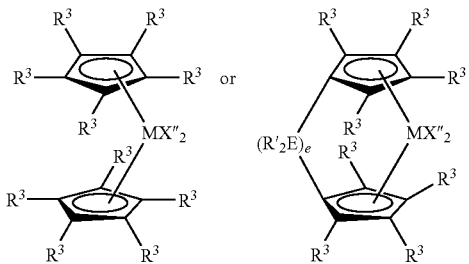

wherein:

M is titanium, zirconium or hafnium, preferably zirconium or hafnium, in the +2 or +4 formal oxidation state;

$R^3$ in each occurrence independently is selected from the group consisting of hydrogen, hydrocarbyl, silyl, germyl, cyano, halo and combinations thereof, said $R^3$ having up to 20 non-hydrogen atoms, or adjacent $R^3$ groups together form a divalent derivative (that is, a hydrocarbadiyl, siladiyl or germadiyl group) thereby forming a fused ring system, and X" independently each occurrence is an anionic ligand group of up to 40 non-hydrogen atoms, or two X" groups together form a divalent anionic ligand group of up to 40 non-hydrogen atoms or together are a conjugated diene having from 4 to 30 non-hydrogen atoms bound by means of delocalized π-electrons to M, whereupon M is in the +2 formal oxidation state, and R', E and e are as previously defined.

Exemplary bridged ligands containing two π-bonded groups are: dimethylbis(cyclopentadienyl)silane, dimethylbis(tetramethylcyclopentadienyl)silane, dimethylbis(2-ethylcyclopentadien-1-yl)silane, dimethylbis(2-t-butylcyclopentadien-1-yl)silane, 2,2-bis(tetramethylcyclopentadienyl) propane, dimethylbis(inden-1-yl)silane, dimethylbis (tetrahydroinden-1-yl)silane, dimethylbis(fluoren-1-yl) silane, dimethylbis(tetrahydrofluoren-1-yl)silane, dimethylbis(2-methyl-4-phenylinden-1-yl)-silane, dimethylbis(2-methylinden-1-yl)silane, dimethyl(cyclopentadienyl) (fluoren-1-yl)silane, dimethyl(cyclopentadienyl)(octahydrofluoren-1-yl)silane, dimethyl(cyclopentadienyl) (tetrahydrofluoren-1-yl)silane, (1, 1, 2, 2-tetramethy)-1,2-bis (cyclopentadienyl)disilane, (1,2-bis(cyclopentadienyl) ethane, and dimethyl(cyclopentadienyl)-1-(fluoren-1-yl) methane.

Preferred X" groups are selected from hydride, hydrocarbyl, silyl, germyl, halohydrocarbyl, halosilyl, silylhydrocarbyl and aminohydrocarbyl groups, or two X" groups together form a divalent derivative of a conjugated diene or else together they form a neutral, π-bonded, conjugated diene. Most preferred X" groups are $C_{1-20}$ hydrocarbyl groups.

Examples of metal complexes of the foregoing formula suitable for use in the present invention include:
bis(cyclopentadienyl)zirconiumdimethyl,
bis(cyclopentadienyl)zirconium dibenzyl,
bis(cyclopentadienyl)zirconium methyl benzyl,
bis(cyclopentadienyl)zirconium methyl phenyl,
bis(cyclopentadienyl)zirconiumdiphenyl,
bis(cyclopentadienyl)titanium-allyl,
bis(cyclopentadienyl)zirconiummethylmethoxide,
bis(cyclopentadienyl)zirconiummethylchloride,
bis(pentamethylcyclopentadienyl)zirconiumdimethyl,
bis(pentamethylcyclopentadienyl)titaniumdimethyl,
bis(indenyl)zirconiumdimethyl,
indenylfluorenylzirconiumdimethyl,
bis(indenyl)zirconiummethyl(2-(dimethylamino)benzyl),
bis(indenyl)zirconiummethyltrimethylsilyl,
bis(tetrahydroindenyl)zirconiummethyltrimethylsilyl,
bis(pentamethylcyclopentadienyl)zirconiummethylbenzyl,
bis(pentamethylcyclopentadienyl)zirconiumdibenzyl,
bis(pentamethylcyclopentadienyl)zirconiummethylmethoxide,
bis(pentamethylcyclopentadienyl)zirconiummethylchloride,
bis(methylethylcyclopentadienyl)zirconiumdimethyl,
bis(butylcyclopentadienyl)zirconiumdibenzyl,
bis(t-butylcyclopentadienyl)zirconiumdimethyl,
bis(ethyltetramethylcyclopentadienyl)zirconiumdimethyl,
bis(methylpropylcyclopentadienyl)zirconiumdibenzyl,
bis(trimethylsilylcyclopentadienyl)zirconiumdibenzyl,
dimethylsilylbis(cyclopentadienyl)zirconiumdichloride,
dimethylsilylbis(cyclopentadienyl)zirconiumdimethyl,
dimethylsilylbis(tetramethylcyclopentadienyl)titanium(III) allyl
dimethylsilylbis(t-butylcyclopentadienyl)zirconiumdichloride,
dimethylsilylbis(n-butylcyclopentadienyl)zirconiumdichloride,
(dimethylsilylbis(tetramethylcyclopentadienyl)titanium(III) 2-(dimethylamino)benzyl,
(dimethylsilylbis(n-butylcyclopentadienyl)titanium(III)2-(dimethylamino)benzyl,
dimethylsilylbis(indenyl)zirconiumdichloride,
dimethylsilylbis(indenyl)zirconiumdimethyl,
dimethylsilylbis(2-methylindenyl)zirconiumdimethyl,
dimethylsilylbis(2-methyl-4-phenylindenyl)zirconiumdimethyl,
dimethylsilylbis(2-methylindenyl)zirconium-1,4-diphenyl-1,3-butadiene,
dimethylsilylbis(2-methyl-4-phenylindenyl)zirconium(II)1, 4-diphenyl-1,3-butadiene,
dimethylsilylbis(4,5,6,7-tetrahydroinden-1-yl)zirconiumdichloride,
dimethylsilylbis(4,5,6,7-tetrahydroinden-1-yl)zirconiumdimethyl,
dimethylsilylbis(tetrahydroindenyl)zirconium(II) 1,4-diphenyl-1,3-butadiene,
dimethylsilylbis(tetramethylcyclopentadienyl)zirconium dimethyl
dimethylsilylbis(fluorenyl)zirconiumdimethyl,
dimethylsilylbis(tetrahydrofluorenyl)zirconium bis(trimethylsilyl),
ethylenebis(indenyl)zirconiumdichloride,
ethylenebis(indenyl)zirconiumdimethyl,
ethylenebis(4,5,6,7-tetrahydroindenyl)zirconiumdichloride,
ethylenebis(4,5,6,7-tetrahydroindenyl)zirconiumdimethyl,
(isopropylidene)(cyclopentadienyl)(fluorenyl)zirconiumdibenzyl, and
dimethylsilyl(tetramethylcyclopentadienyl)(fluorenyl)zirconium dimethyl.

A further class of metal complexes utilized in the present invention corresponds to the preceding formula: $MKZ_ZX_X$, or a dimer thereof, wherein M, K, X, x and z are as previously defined, and Z is a substituent of up to 50 non-hydrogen atoms that together with K forms a metallocycle with M.

Preferred Z substituents include groups containing up to 30 non-hydrogen atoms comprising at least one atom that is oxygen, sulfur, boron or a member of Group 14 of the Periodic Table of the Elements directly attached to K, and a different atom, selected from the group consisting of nitrogen, phosphorus, oxygen or sulfur that is covalently bonded to M.

More specifically this class of Group 4 metal complexes used according to the present invention includes "constrained geometry catalysts" corresponding to the formula:

wherein:

M is titanium or zirconium, preferably titanium in the +2, +3, or +4 formal oxidation state;

$K^1$ is a delocalized, π-bonded ligand group optionally substituted with from 1 to 5 $R^2$ groups, $R^2$ in each occurrence independently is selected from the group consisting of hydrogen, hydrocarbyl, silyl, germyl, cyano, halo and combinations thereof, said $R^2$ having up to 20 non-hydrogen atoms, or adjacent $R^2$ groups together form a divalent derivative (that is, a hydrocarbadiyl, siladiyl or germadiyl group) thereby forming a fused ring system, each X is independently a halo, hydride, hydrocarbyl, hydrocarbyloxy or silyl group, said group having up to 20 non-hydrogen atoms, or two X groups together form a neutral $C_{5-30}$ conjugated diene or a divalent derivative thereof;

x is 1 or 2;

Y is —O—, —S—, —NR'—, —PR'—; and

X' is $SiR'_2$, $CR'_2$, $SiR'_2SiR'_2$, $CR'_2CR'_2$, $CR'$=$CR'$, $CR'_2SiR'_2$, or $GeR'_2$, wherein R' independently each occurrence is hydrogen or a group selected from silyl, hydrocarbyl, hydrocarbyloxy and combinations thereof, said R' having up to 30 carbon or silicon atoms.

Specific examples of the foregoing constrained geometry metal complexes include compounds corresponding to the formula:

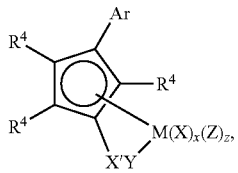

wherein,

Ar is an aryl group of from 6 to 30 atoms not counting hydrogen;

$R^4$ independently each occurrence is hydrogen, Ar, or a group other than Ar selected from hydrocarbyl, trihydrocarbylsilyl, trihydrocarbylgermyl, halide, hydrocarbyloxy, trihydrocarbylsiloxy, bis(trihydrocarbylsilyl)amino, di(hydrocarbyl)amino, hydrocarbadiylamino, hydrocarbylimino, di(hydrocarbyl)phosphino, hydrocarbadiylphosphino, hydrocarbylsulfido, halo-substituted hydrocarbyl, hydrocarbyloxy-substituted hydrocarbyl, trihydrocarbylsilyl-substituted hydrocarbyl, trihydrocarbylsiloxy-substituted hydrocarbyl, bis(trihydrocarbylsilyl)amino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said R group having up to 40 atoms not counting hydrogen atoms, and optionally two adjacent $R^4$ groups may be joined together forming a polycyclic fused ring group;

M is titanium;

X' is $SiR^6_2$, $CR^6_2$, $SiR^6_2SiR^6_2$, $CR^6_2CR^6_2$, $CR^6$=$CR^6$, $CR^6_2SiR^6_2$, $BR^6$, $BR^6L''$, or $GeR^6_2$;

Y is —O—, —S—, —$NR^5$—, —$PR^5$—; $NR^5_2$, or —$PR^5_2$;

$R^5$, independently each occurrence, is hydrocarbyl, trihydrocarbylsilyl, or trihydrocarbylsilylhydrocarbyl, said $R^5$ having up to 20 atoms other than hydrogen, and optionally two $R^5$ groups or $R^5$ together with Y or Z form a ring system;

$R^6$, independently each occurrence, is hydrogen, or a member selected from hydrocarbyl, hydrocarbyloxy, silyl, halogenated alkyl, halogenated aryl, —$NR^5_2$, and combinations thereof, said $R^6$ having up to 20 non-hydrogen atoms, and optionally, two $R^6$ groups or $R^6$ together with Z forms a ring system;

Z is a neutral diene or a monodentate or polydentate Lewis base optionally bonded to $R^5$, $R^6$, or X;

X is hydrogen, a monovalent anionic ligand group having up to 60 atoms not counting hydrogen, or two X groups are joined together thereby forming a divalent ligand group;

x is 1 or 2; and z is 0, 1 or 2.

Preferred examples of the foregoing metal complexes are substituted at both the 3- and 4-positions of a cyclopentadienyl or indenyl group with an Ar group.

Examples of the foregoing metal complexes include:
(3-phenylcyclopentadien-1-yl)dimethyl(t-butylamido)silanetitanium dichloride,
(3-phenylcyclopentadien-1-yl)dimethyl(t-butylamido)silanetitanium dimethyl,
(3-phenylcyclopentadien-1-yl)dimethyl(t-butylamido)silanetitanium(II)1,3-diphenyl-1,3-butadiene;
(3-(pyrrol-1-yl)cyclopentadien-1-yl)dimethyl(t-butylamido) silanetitanium dichloride,
(3-(pyrrol-1-yl)cyclopentadien-1-yl)dimethyl(t-butylamido) silanetitanium dimethyl, (3-(pyrrol-1-yl)cyclopentadien-1-yl))dimethyl(t-butylamido)silanetitanium(II)1,4-diphenyl-1,3-butadiene;
(3-(1-methylpyrrol-3-yl)cyclopentadien-1-yl)dimethyl(t-butylamido)silanetitanium dichloride,
(3-(1-methylpyrrol-3-yl)cyclopentadien-1-yl)dimethyl(t-butylamido)silanetitanium dimethyl,
(3-(1-methylpyrrol-3-yl)cyclopentadien-1-yl)dimethyl(t-butylamido)silanetitanium(II)1,4-diphenyl-1,3-butadiene;
(3,4-diphenylcyclopentadien-1-yl)dimethyl(t-butylamido) silanetitanium dichloride,
(3,4-diphenylcyclopentadien-1-yl)dimethyl(t-butylamido) silanetitanium dimethyl,
(3,4-diphenylcyclopentadien-1-yl)dimethyl(t-butylamido) silanetitanium(II)1,3-pentadiene;
(3-(3-N,N-dimethylamino)phenyl)cyclopentadien-1-yl)dimethyl(t-butylamido)silanetitanium dichloride,
(3-(3-N,N-dimethylamino)phenylcyclopentadien-1-yl)dimethyl(t-butylamido)silanetitanium dimethyl,
(3-(3-N,N-dimethylamino)phenylcyclopentadien-1-yl)dimethyl(t-butylamido)silanetitanium (II) 1,4-diphenyl-1,3-butadiene;
(3-(4-methoxyphenyl)-4-methylcyclopentadien-1-yl)dimethyl(t-butylamido)silanetitanium dichloride,
(3-(4-methoxyphenyl)-4-phenylcyclopentadien-1-yl)dimethyl(t-butylamido)silanetitanium dimethyl,
(3-4-methoxyphenyl)-4-phenylcyclopentadien-1-yl)dimethyl(t-butylamido)silanetitanium(II)1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium(II)1,4-diphenyl-1,3-butadiene;
(3-phenyl-4-(N,N-dimethylamino)cyclopentadien-1-yl)dimethyl(t-butylamido)silanetitanium dichloride,
(3-phenyl-4-(N,N-dimethylamino)cyclopentadien-1-yl)dimethyl(t-butylamido)silanetitanium dimethyl,
(3-phenyl-4-(N,N-dimethylamino)cyclopentadien-1-yl)dimethyl(t-butylamido)silanetitanium (II) 1,4-diphenyl-1,3-butadiene;
2-methyl-(3,4-di(4-methylphenyl)cyclopentadien-1-yl)dimethyl(t-butylamido)silanetitanium dichloride,
2-methyl-(3,4-di(4-methylphenyl)cyclopentadien-1-yl)dimethyl(t-butylamido)silanetitanium dimethyl,
2-methyl-(3,4-di(4-methylphenyl)cyclopentadien-1-yl)dimethyl(t-butylamido)silanetitanium (II) 1,4-diphenyl-1,3-butadiene;
((2,3-diphenyl)-4-(N,N-dimethylamino)cyclopentadien-1-yl)dimethyl(t-butylamido)silane titanium dichloride,
((2,3-diphenyl)-4-(N,N-dimethylamino)cyclopentadien-1-yl)dimethyl(t-butylamido)silane titanium dimethyl, ((2,3-diphenyl)-4-(N,N-dimethylamino)cyclopentadien-1-yl)dimethyl(t-butylamido)silanetitanium(II)1,4-diphenyl-1,3-butadiene;
(2,3,4-triphenyl-5-methylcyclopentadien-1-yl)dimethyl(t-butylamido)silanetitanium dichloride,
(2,3,4-triphenyl-5-methylcyclopentadien-1-yl)dimethyl(t-butylamido)silanetitanium dimethyl,
(2,3,4-triphenyl-5-methylcyclopentadien-1-yl)dimethyl(t-butylamido)silanetitanium(II)1,4-diphenyl-1,3-butadiene;
(3-phenyl-4-methoxycyclopentadien-1-yl)dimethyl(t-butylamido)silanetitanium dichloride,
(3-phenyl-4-methoxycyclopentadien-1-yl)dimethyl(t-butylamido)silanetitanium dimethyl,
(3-phenyl-4-methoxycyclopentadien-1-yl)dimethyl(t-butylamido)silanetitanium(II)1,4-diphenyl-1,3-butadiene;
(2,3-diphenyl-4-(n-butyl)cyclopentadien-1-yl)dimethyl(t-butylamido)silanetitanium dichloride,
(2,3-diphenyl-4-(n-butyl)cyclopentadien-1-yl)dimethyl(t-butylamido)silanetitanium dimethyl,
(2,3-diphenyl-4-(n-butyl)cyclopentadien-1-yl)dimethyl(t-butylamido)silanetitanium(II)1,4-diphenyl-1,3-butadiene;
(2,3,4,5-tetraphenylcyclopentadien-1-yl)dimethyl(t-butylamido)silanetitanium dichloride,
(2,3,4,5-tetraphenylcyclopentadien-1-yl)dimethyl(t-butylamido)silanetitanium dimethyl, and
(2,3,4,5-tetraphenylcyclopentadien-1-yl)dimethyl(t-butylamido)silanetitanium(II)1,4-diphenyl-1,3-butadiene.

Additional examples of suitable metal complexes for use herein are polycyclic complexes corresponding to the formula:

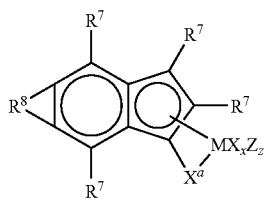

where M is titanium in the +2, +3 or +4 formal oxidation state;

$R^7$ independently each occurrence is hydride, hydrocarbyl, silyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylenephosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^7$ group having up to 40 atoms not counting hydrogen, and optionally two or more of the foregoing groups may together form a divalent derivative;

$R^8$ is a divalent hydrocarbylene- or substituted hydrocarbylene group forming a fused system with the remainder of the metal complex, said $R^8$ containing from 1 to 30 atoms not counting hydrogen;

$X^a$ is a divalent moiety, or a moiety comprising one τ-bond and a neutral two electron pair able to form a coordinate-covalent bond to M, said $X^a$ comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic, delocalized, t-bound ligand groups and optionally two X groups together form a divalent ligand group;

Z independently each occurrence is a neutral ligating compound having up to 20 atoms;

x is 0, 1 or 2; and z is zero or 1.

Preferred examples of such complexes are 3-phenyl-substituted s-indecenyl complexes corresponding to the formula:

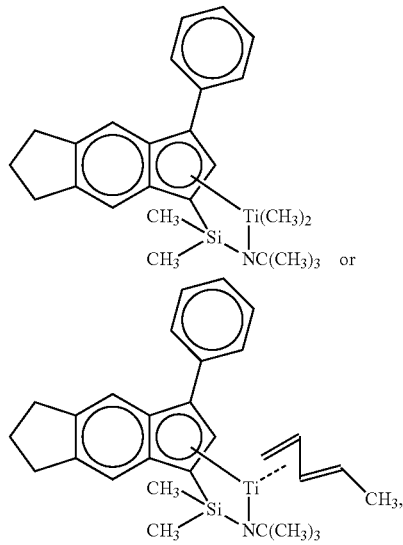

2,3-dimethyl-substituted s-indecenyl complexes corresponding to the formulas:

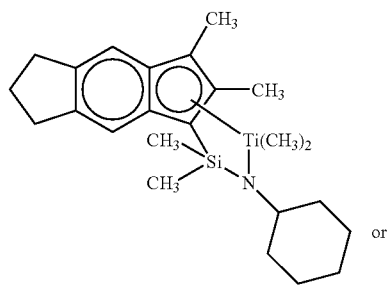

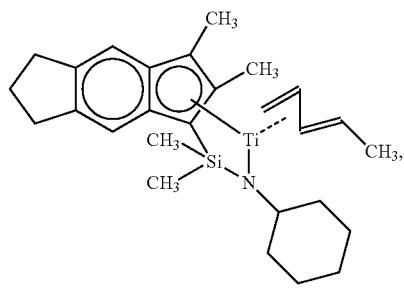

or 2-methyl-substituted s-indecenyl complexes corresponding to the formula:

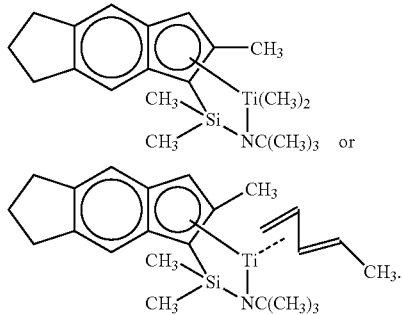

Additional examples of metal complexes that are usefully employed according to the present invention include those of the formula:

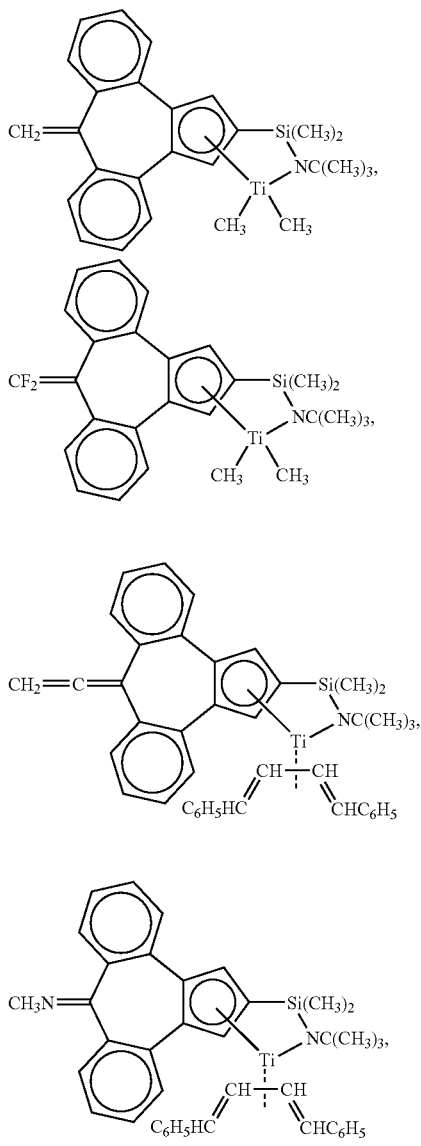

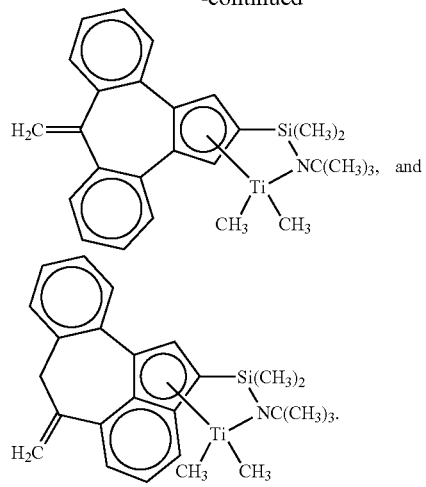

Specific metal complexes include:
(8-methylene-1,8-dihydrodibenzo[e,h]azulen-1-yl)-N-(1,1-dimethylethyl)dimethylsilanamide titanium(II)1,4-diphenyl-1,3-butadiene,
(8-methylene-1,8-dihydrodibenzo[e,h]azulen-1-yl)-N-(1,1-dimethylethyl)dimethylsilanamide titanium(II)1,3-pentadiene,
(8-methylene-1,8-dihydrodibenzo[e,h]azulen-1-yl)-N-(1,1-dimethylethyl)dimethylsilanamide titanium(III)2-(N,N-dimethylamino)benzyl,
(8-methylene-1,8-dihydrodibenzo[e,h]azulen-1-yl)-N-(1,1-dimethylethyl)dimethylsilanamide titanium(IV)dichloride,
(8-methylene-1,8-dihydrodibenzo[e,h]azulen-1-yl)-N-(1,1-dimethylethyl)dimethylsilanamide titanium(IV)dimethyl,
(8-methylene-1,8-dihydrodibenzo[e,h]azulen-1-yl)-N-(1,1-dimethylethyl)dimethylsilanamide titanium(IV)dibenzyl,
(8-difluoromethylene-1,8-dihydrodibenzo[e,h]azulen-1-yl)-N-(1,1-dimethylethyl)dimethylsilanamide titanium(II)1,4-diphenyl-1,3-butadiene,
(8-difluoromethylene-1,8-dihydrodibenzo[e,h]azulen-1-yl)-N-(1,1-dimethylethyl)dimethylsilanamide titanium(II)1,3-pentadiene,
(8-difluoromethylene-1,8-dihydrodibenzo[e,h]azulen-1-yl)-N-(1,1-dimethylethyl)dimethylsilanamide titanium(III)2-(N,N-dimethylamino)benzyl,
(8-difluoromethylene-1,8-dihydrodibenzo[e,h]azulen-1-yl)-N-(1,1-dimethylethyl)dimethylsilanamide titanium(IV) dichloride,
(8-difluoromethylene-1,8-dihydrodibenzo[e,h]azulen-1-yl)-N-(1,1-dimethylethyl)dimethylsilanamide titanium(IV) dimethyl,
(8-difluoromethylene-1,8-dihydrodibenzo[e,h]azulen-1-yl)-N-(1,1-dimethylethyl)dimethylsilanamide titanium(IV) dibenzyl,
(8-methylene-1,8-dihydrodibenzo[e,h]azulen-2-yl)-N-(1,1-dimethylethyl)dimethylsilanamide titanium(II)1,4-diphenyl-1,3-butadiene,
(8-methylene-1,8-dihydrodibenzo[e,h]azulen-2-yl)-N-(1,1-dimethylethyl)dimethylsilanamide titanium(II)1,3-pentadiene,
(8-methylene-1,8-dihydrodibenzo[e,h]azulen-2-yl)-N-(1,1-dimethylethyl)dimethylsilanamide titanium(III)2-(N,N-dimethylamino)benzyl,
(8-methylene-1,8-dihydrodibenzo[e,h]azulen-2-yl)-N-(1,1-dimethylethyl)dimethylsilanamide titanium(IV)dichloride, (8-methylene-1,8-dihydrodibenzo[e,h]azulen-2-yl)-N-(1,1-dimethylethyl)dimethylsilanamide titanium(IV)dimethyl,
(8-methylene-1,8-dihydrodibenzo[e,h]azulen-2-yl)-N-(1,1-dimethylethyl)dimethylsilanamide titanium(IV)dibenzyl,
(8-difluoromethylene-1,8-dihydrodibenzo[e,h]azulen-2-yl)-N-(1,1-dimethylethyl)dimethylsilanamide titanium(II)1,4-diphenyl-1,3-butadiene,
(8-difluoromethylene-1,8-dihydrodibenzo[e,h]azulen-2-yl)-N-(1,1-dimethylethyl)dimethylsilanamide titanium(II)1,3-pentadiene,
(8-difluoromethylene-1,8-dihydrodibenzo[e,h]azulen-2-yl)-N-(1,1-dimethylethyl)dimethylsilanamide titanium(III)2-(N,N-dimethylamino)benzyl,
(8-difluoromethylene-1,8-dihydrodibenzo[e,h]azulen-2-yl)-N-(1,1-dimethylethyl)dimethylsilanamide titanium(IV) dichloride,
(8-difluoromethylene-1,8-dihydrodibenzo[e,h]azulen-2-yl)-N-(1,1-dimethylethyl)dimethylsilanamide titanium(IV)dimethyl,
(8-difluoromethylene-1,8-dihydrodibenzo[e,h]azulen-2-yl)-N-(1,1-dimethylethyl)dimethylsilanamide titanium(IV) dibenzyl, and mixtures thereof, especially mixtures of positional isomers.

Further illustrative examples of metal complexes for use according to the present invention correspond to the formula:

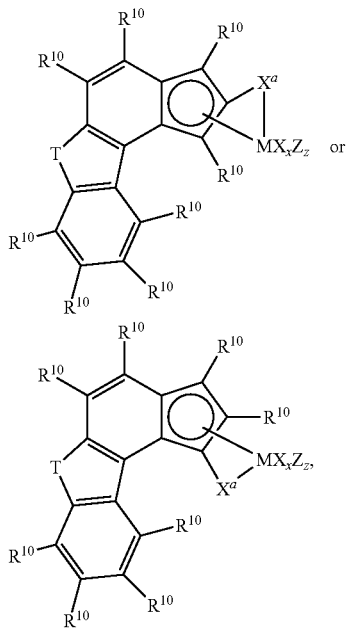

where M is titanium in the +2, +3 or +4 formal oxidation state;

T is —$NR^9$— or —O—;

$R^9$ is hydrocarbyl, silyl, germyl, dihydrocarbylboryl, or halohydrocarbyl or up to 10 atoms not counting hydrogen;

$R^{10}$ independently each occurrence is hydrogen, hydrocarbyl, trihydrocarbylsilyl, trihydrocarbylsilylhydrocarbyl, germyl, halide, hydrocarbyloxy, hydrocarbylsiloxy, hydrocarbylsilylamino, di(hydrocarbyl)amino, hydrocarbyleneamino, di(hydrocarbyl)phosphino, hydrocarbylene-phosphino, hydrocarbylsulfido, halo-substituted hydrocarbyl, hydrocarbyloxy-substituted hydrocarbyl, silyl-substituted hydrocarbyl, hydrocarbylsiloxy-substituted hydrocarbyl, hydrocarbylsilylamino-substituted hydrocarbyl, di(hydrocarbyl)amino-substituted hydrocarbyl, hydrocarbyleneamino-substituted hydrocarbyl, di(hydrocarbyl)phosphino-substituted hydrocarbyl, hydrocarbylenephosphino-substituted hydrocarbyl, or hydrocarbylsulfido-substituted hydrocarbyl, said $R^{10}$ group having up to 40 atoms not counting hydrogen atoms, and optionally two or more of the foregoing adjacent $R^{10}$ groups may together form a divalent derivative thereby forming a saturated or unsaturated fused ring;

$X^a$ is a divalent moiety lacking in delocalized π-electrons, or such a moiety comprising one τ-bond and a neutral two electron pair able to form a coordinate-covalent bond to M, said X' comprising boron, or a member of Group 14 of the Periodic Table of the Elements, and also comprising nitrogen, phosphorus, sulfur or oxygen;

X is a monovalent anionic ligand group having up to 60 atoms exclusive of the class of ligands that are cyclic ligand groups bound to M through delocalized π-electrons or two X groups together are a divalent anionic ligand group;

Z independently each occurrence is a neutral ligating compound having up to 20 atoms;

x is 0, 1, 2, or 3; and z is 0 or 1.

Highly preferably T is =$N(CH_3)$, X is halo or hydrocarbyl, x is 2, X' is dimethylsilane, z is 0, and $R^{10}$ each occurrence is hydrogen, a hydrocarbyl, hydrocarbyloxy, dihydrocarbylamino, hydrocarbyleneamino, dihydrocarbylamino-substituted hydrocarbyl group, or hydrocarbyleneamino-substituted hydrocarbyl group of up to 20 atoms not counting hydrogen, and optionally two $R^{10}$ groups may be joined together.

Illustrative metal complexes of the foregoing formula that may be employed in the practice of the present invention further include the following compounds:
(t-butylamido)dimethyl-[6,7]benzo-[4,5:2',3'](1-methylisoindol)-(3H)-indene-2-yl)silanetitanium(II)1,4-diphenyl-1,3-butadiene,
(t-butylamido)dimethyl-[6,7]benzo-[4,5:2',3'](1-methylisoindol)-(3H)-indene-2-yl)silanetitanium(II)1,3-pentadiene,
(t-butylamido)dimethyl-[6,7]benzo-[4, 5:2',3'](1-methylisoindol)-(3H)-indene-2-yl)silanetitanium(III)2-(N,N-dimethylamino)benzyl,
(t-butylamido)dimethyl-[6,7]benzo-[4, 5:2',3'](1-methylisoindol)-(3H)-indene-2-yl)silanetitanium(IV)dichloride,
(t-butylamido)dimethyl-[6,7]benzo-[4, 5:2',3'](1-methylisoindol)-(3H)-indene-2-yl)silanetitanium(IV)dimethyl,
(t-butylamido)dimethyl-[6,7]benzo-[4, 5:2',3'](1-methylisoindol)-(3H)-indene-2-yl)silanetitanium(IV)dibenzyl,
(t-butylamido)dimethyl-[6,7]benzo-[4, 5:2',3'](1-methylisoindol)-(3H)-indene-2-yl)silanetitanium(IV)bis(trimethylsilyl),
(cyclohexylamido)dimethyl-[6,7]benzo-[4,5:2',3'](1-methylisoindol)-(3H)-indene-2-yl)silanetitanium(II)1,4-diphenyl-1,3-butadiene,
(cyclohexylamido)dimethyl-[6,7]benzo-[4,5:2',3'](1-methylisoindol)-(3H)-indene-2-yl)silanetitanium(II)1,3-pentadiene,
(cyclohexylamido)dimethyl-[6,7]benzo-[4,5:2',3'](1-methylisoindol)-(3H)-indene-2-yl)silanetitanium(III)2-(N,N-dimethylamino)benzyl,
(cyclohexylamido)dimethyl-[6,7]benzo-[4,5:2',3'](1-methylisoindol)-(3H)-indene-2-yl)silanetitanium(IV)dichloride,
(cyclohexylamido)dimethyl-[6,7]benzo-[4,5:2',3'](1-methylisoindol)-(3H)-indene-2-yl)silanetitanium(IV)dimethyl, (cyclohexylamido)dimethyl-[6,7]benzo-[4,5:2',3'](1-methylisoindol)-(3H)-indene-2-yl)silanetitanium(IV)dibenzyl,
(cyclohexylamido)dimethyl-[6,7]benzo-[4,5:2',3'](1-methylisoindol)-(3H)-indene-2-yl)silanetitanium(IV)bis(trimethylsilyl),
(t-butylamido)di(p-methylphenyl)-[6,7]benzo-[4,5:2',3'](1-methylisoindol)-(3H)-indene-2-yl)silanetitanium(II)1,4-diphenyl-1,3-butadiene,
(t-butylamido)di(p-methylphenyl)-[6,7]benzo-[4,5:2',3'](1-methylisoindol)-(3H)-indene-2-yl)silanetitanium(II)1,3-pentadiene,
(t-butylamido)di(p-methylphenyl)-[6,7]benzo-[4,5:2',3'](1-methylisoindol)-(3H)-indene-2-yl)silanetitanium(III)2-(N,N-dimethylamino)benzyl,
(t-butylamido)di(p-methylphenyl)-[6,7]benzo-[4,5:2',3'](1-methylisoindol)-(3H)-indene-2-yl)silanetitanium(IV) dichloride,
(t-butylamido)di(p-methylphenyl)-[6,7]benzo-[4,5:2',3'](1-methylisoindol)-(3H)-indene-2-yl)silanetitanium(IV) dimethyl,
(t-butylamido)di(p-methylphenyl)-[6,7]benzo-[4,5:2',3'](1-methylisoindol)-(3H)-indene-2-yl)silanetitanium(IV) dibenzyl,
(t-butylamido)di(p-methylphenyl)-[6,7]benzo-[4,5:2',3'](1-methylisoindol)-(3H)-indene-2-yl)silanetitanium(IV)bis(trimethylsilyl),
(cyclohexylamido)di(p-methylphenyl)-[6,7]benzo-[4, 5:2', 3'](1-methylisoindol)-(3H)-indene-2-yl)silanetitanium(II) 1,4-diphenyl-1,3-butadiene,
(cyclohexylamido)di(p-methylphenyl)-[6,7]benzo-[4, 5:2', 3'](1-methylisoindol)-(3H)-indene-2-yl)silanetitanium(II) 1,3-pentadiene,
(cyclohexylamido)di(p-methylphenyl)-[6,7]benzo-[4, 5:2', 3'](1-methylisoindol)-(3H)-indene-2-yl)silanetitanium (III)2-(N,N-dimethylamino)benzyl,
(cyclohexylamido)di(p-methylphenyl)-[6,7]benzo-[4, 5:2', 3'](1-methylisoindol)-(3H)-indene-2-yl)silanetitanium (IV)dichloride,
(cyclohexylamido)di(p-methylphenyl)-[6,7]benzo-[4, 5:2', 3'](1-methylisoindol)-(3H)-indene-2-yl)silanetitanium (IV)dimethyl,
(cyclohexylamido)di(p-methylphenyl)-[6,7]benzo-[4, 5:2', 3'](1-methylisoindol)-(3H)-indene-2-yl)silanetitanium (IV)dibenzyl; and
(cyclohexylamido)di(p-methylphenyl)-[6,7]benzo-[4, 5:2', 3'](1-methylisoindol)-(3H)-indene-2-yl)silanetitanium (IV)bis(trimethylsilyl).

Illustrative Group 4 metal complexes that may be employed in the practice of the present invention further include:
(tert-butylamido)(1,1-dimethyl-2,3,4,9,10-η-1,4,5,6,7,8-hexahydronaphthalenyl)dimethylsilanetitaniumdimethyl,
(tert-butylamido)(1,1,2,3-tetramethyl-2,3,4,9,10-η-1,4,5,6,7,8-hexahydronaphthalenyl)dimethylsilanetitaniumdimethyl,
(tert-butylamido)(tetramethyl-$\eta^5$-cyclopentadienyl)dimethylsilanetitanium dibenzyl,
(tert-butylamido)(tetramethyl-$\eta^5$-cyclopentadienyl)dimethylsilanetitanium dimethyl,
(tert-butylamido)(tetramethyl-$\eta^5$-cyclopentadienyl)-1,2-ethanediyltitanium dimethyl,
(tert-butylamido)(tetramethyl-$\eta^5$-indenyl)dimethylsilanetitanium dimethyl,
(tert-butylamido)(tetramethyl-$\eta^5$-cyclopentadienyl)dimethylsilane titanium(III)2-(dimethylamino)benzyl;
(tert-butylamido)(tetramethyl-$\eta^5$-cyclopentadienyl)dimethylsilanetitanium(III)allyl,
(tert-butylamido)(tetramethyl-$\eta^5$-cyclopentadienyl)dimethylsilanetitanium(III)2,4-dimethylpentadienyl,
(tert-butylamido)(tetramethyl-$\eta^5$-cyclopentadienyl)dimethylsilanetitanium(II)1,4-diphenyl-1,3-butadiene,
(tert-butylamido)(tetramethyl-$\eta^5$-cyclopentadienyl)dimethylsilanetitanium(II)1,3-pentadiene,
(tert-butylamido)(2-methylindenyl)dimethylsilanetitanium (II)1,4-diphenyl-1,3-butadiene,
(tert-butylamido)(2-methylindenyl)dimethylsilanetitanium (II)2,4-hexadiene,
(tert-butylamido)(2-methylindenyl)dimethylsilanetitanium (IV)2,3-dimethyl-1,3-butadiene,
(tert-butylamido)(2-methylindenyl)dimethylsilanetitanium (IV)isoprene,
(tert-butylamido)(2-methylindenyl)dimethylsilanetitanium (IV)1,3-butadiene,
(tert-butylamido)(2,3-dimethylindenyl)dimethylsilanetitanium(IV)2,3-dimethyl-1,3-butadiene,
(tert-butylamido)(2,3-dimethylindenyl)dimethylsilanetitanium(IV)isoprene
(tert-butylamido)(2,3-dimethylindenyl)dimethylsilanetitanium(IV)dimethyl
(tert-butylamido)(2,3-dimethylindenyl)dimethylsilanetitanium(IV)dibenzyl
(tert-butylamido)(2,3-dimethylindenyl)dimethylsilanetitanium(IV)1,3-butadiene,
(tert-butylamido)(2,3-dimethylindenyl)dimethylsilanetitanium(II)1,3-pentadiene,
(tert-butylamido)(2,3-dimethylindenyl)dimethylsilanetitanium(II)1,4-diphenyl-1,3-butadiene,
(tert-butylamido)(2-methylindenyl)dimethylsilanetitanium (II)1,3-pentadiene,
(tert-butylamido)(2-methylindenyl)dimethylsilanetitanium (IV)dimethyl,
(tert-butylamido)(2-methylindenyl)dimethylsilanetitanium (IV)dibenzyl,
(tert-butylamido)(2-methyl-4-phenylindenyl)dimethylsilanetitanium(II)1,4-diphenyl-1,3-butadiene,
(tert-butylamido)(2-methyl-4-phenylindenyl)dimethylsilanetitanium(II)1,3-pentadiene,
(tert-butylamido)(2-methyl-4-phenylindenyl)dimethylsilanetitanium(II)2,4-hexadiene,
(tert-butylamido)(tetramethyl-$\eta^5$-cyclopentadienyl)dimethyl-silanetitanium(IV)1,3-butadiene,
(tert-butylamido)(tetramethyl-$\eta^5$-cyclopentadienyl)dimethylsilanetitanium(IV)2,3-dimethyl-1,3-butadiene,
(tert-butylamido)(tetramethyl-$\eta^5$-cyclopentadienyl)dimethylsilanetitanium(IV)isoprene,
(tert-butylamido)(tetramethyl-$\eta^5$-cyclopentadienyl)dimethyl-silanetitanium(II)1,4-dibenzyl-1,3-butadiene,
(tert-butylamido)(tetramethyl-$\eta^5$-cyclopentadienyl)dimethylsilanetitanium(II)2,4-hexadiene,
(tert-butylamido)(tetramethyl-$\eta^5$-cyclopentadienyl)dimethyl-silanetitanium(II)3-methyl-1,3-pentadiene,
(tert-butylamido)(2,4-dimethylpentadien-3-yl)dimethylsilanetitaniumdimethyl,
(tert-butylamido)(6,6-dimethylcyclohexadienyl)dimethylsilanetitaniumdimethyl,
(tert-butylamido)(1,1-dimethyl-2,3,4,9,10-η-1,4,5,6,7,8-hexahydronaphthalen-4-yl)dimethylsilanetitaniumdimethyl,
(tert-butylamido)(1,1,2,3-tetramethyl-2,3,4,9,10-η-1,4,5,6,7,8-hexahydronaphthalen-4-yl)dimethylsilanetitaniumdimethyl
(tert-butylamido)(tetramethyl-$\eta^5$-cyclopentadienyl methylphenylsilanetitanium(IV)dimethyl, (tert-butylamido)(tetramethyl-η⁵-cyclopentadienyl methylphenylsilanetitanium(II)1,4-diphenyl-1,3-butadiene,
1-(tert-butylamido)-2-(tetramethyl-η⁵-cyclopentadienyl) ethanediyltitanium(IV)dimethyl, and
1-(tert-butylamido)-2-(tetramethyl-η⁵-cyclopentadienyl) ethanediyl-titanium(II)1,4-diphenyl-1,3-butadiene.

Other delocalized, π-bonded complexes, especially those containing other Group 4 metals, will, of course, be apparent to those skilled in the art, and are disclosed among other places in: WO 03/78480, WO 03/78483, WO 02/92610, WO 02/02577, US 2003/0004286 and U.S. Pat. Nos. 6,515,155, 6,555,634, 6,150,297, 6,034,022, 6,268,444, 6,015,868, 5,866,704, and 5,470,993.

Additional examples of metal complexes that are usefully employed as catalysts in the present invention are complexes of polyvalent Lewis bases corresponding to the formula:

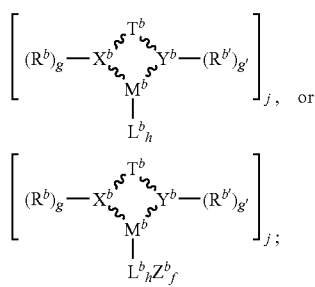

preferably

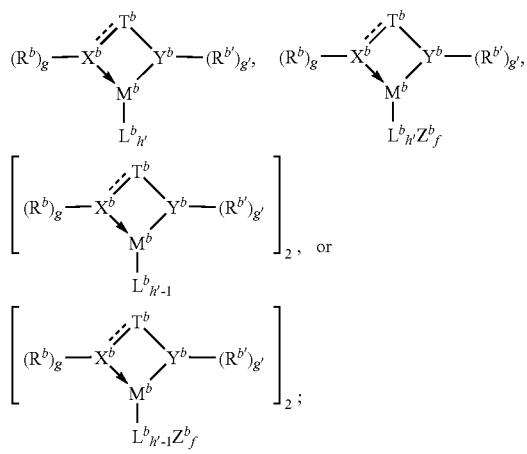

wherein $T^b$ is a bridging group, preferably containing 2 or more atoms other than hydrogen, $X^b$ and $Y^b$ are each independently selected from the group consisting of nitrogen, sulfur, oxygen and phosphorus; more preferably both $X^b$ and $Y^b$ are nitrogen, $R^b$ and $R^{b'}$ independently each occurrence are hydrogen or $C_{1-50}$ hydrocarbyl groups optionally containing one or more heteroatoms or inertly substituted derivative thereof. Non-limiting examples of suitable $R^b$ and $R^{b'}$ groups include alkyl, alkenyl, aryl, aralkyl, (poly)alkylaryl and cycloalkyl groups, as well as nitrogen, phosphorus, oxygen and halogen substituted derivatives thereof. Specific examples of suitable $R^b$ and $R^{b'}$ groups include methyl, ethyl, isopropyl, octyl, phenyl, 2,6-dimethylphenyl, 2,6-di(isopropyl)phenyl, 2,4,6-trimethylphenyl, pentafluorophenyl, 3,5-trifluoromethylphenyl, and benzyl;

g is 0 or 1;

$M^b$ is a metallic element selected from Groups 3 to 15, or the Lanthanide series of the Periodic Table of the Elements. Preferably, $M^b$ is a Group 3-13 metal, more preferably $M^b$ is a Group 4-10 metal;

$L^b$ is a monovalent, divalent, or trivalent anionic ligand containing from 1 to 50 atoms, not counting hydrogen. Examples of suitable $L^b$ groups include halide; hydride; hydrocarbyl, hydrocarbyloxy; di(hydrocarbyl)amido, hydrocarbyleneamido, di(hydrocarbyl)phosphido; hydrocarbylsulfido; hydrocarbyloxy, tri(hydrocarbylsilyl)alkyl; and carboxylates. More preferred $L^b$ groups are $C_{1-20}$ alkyl, $C_{7-20}$ aralkyl, and chloride;

h is an integer from 1 to 6, preferably from 1 to 4, more preferably from 1 to 3, and j is 1 or 2, with the value h x j selected to provide charge balance;

$Z^b$ is a neutral ligand group coordinated to $M^b$, and containing up to 50 atoms not counting hydrogen Preferred $Z^b$ groups include aliphatic and aromatic amines, phosphines, and ethers, alkenes, alkadienes, and inertly substituted derivatives thereof. Suitable inert substituents include halogen, alkoxy, aryloxy, alkoxycarbonyl, aryloxycarbonyl, di(hydrocarbyl)amine, tri(hydrocarbyl)silyl, and nitrile groups. Preferred $Z^b$ groups include triphenylphosphine, tetrahydrofuran, pyridine, and 1,4-diphenylbutadiene;

f is an integer from 1 to 3;

two or three of $T^b$, $R^b$ and $R^{b'}$ may be joined together to form a single or multiple ring structure;

h is an integer from 1 to 6, preferably from 1 to 4, more preferably from 1 to 3;

⁓ indicates any form of electronic interaction, especially coordinate or covalent bonds, including multiple bonds, arrows signify coordinate bonds, and dotted lines indicate optional double bonds.

In one embodiment, it is preferred that $R^b$ have relatively low steric hindrance with respect to $X^b$. In this embodiment, most preferred $R^b$ groups are straight chain alkyl groups, straight chain alkenyl groups, branched chain alkyl groups wherein the closest branching point is at least 3 atoms removed from $X^b$, and halo, dihydrocarbylamino, alkoxy or trihydrocarbylsilyl substituted derivatives thereof. Highly preferred $R^b$ groups in this embodiment are $C_{1-8}$ straight chain alkyl groups.

At the same time, in this embodiment $R^{b'}$ preferably has relatively high steric hindrance with respect to $Y^b$. Non-limiting examples of suitable $R^{b'}$ groups for this embodiment include alkyl or alkenyl groups containing one or more secondary or tertiary carbon centers, cycloalkyl, aryl, alkaryl, aliphatic or aromatic heterocyclic groups, organic or inorganic oligomeric, polymeric or cyclic groups, and halo, dihydrocarbylamino, alkoxy or trihydrocarbylsilyl substituted derivatives thereof. Preferred $R^{b'}$ groups in this embodiment contain from 3 to 40, more preferably from 3 to 30, and most preferably from 4 to 20 atoms not counting hydrogen and are branched or cyclic.

Examples of preferred $T^b$ groups are structures corresponding to the following formulas:

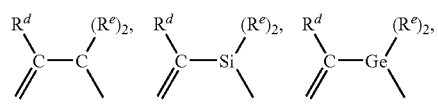

-continued

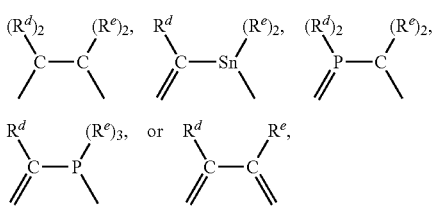

wherein

Each $R^d$ is $C_{1-10}$ hydrocarbyl group, preferably methyl, ethyl, n-propyl, i-propyl, t-butyl, phenyl, 2,6-dimethylphenyl, benzyl, or tolyl. Each $R^e$ is $C_{1-10}$ hydrocarbyl, preferably methyl, ethyl, n-propyl, i-propyl, t-butyl, phenyl, 2,6-dimethylphenyl, benzyl, or tolyl. In addition, two or more Rd or $R^e$ groups, or mixtures of $R^d$ and $R^e$ groups may together form a polyvalent derivative of a hydrocarbyl group, such as, 1,4-butylene, 1,5-pentylene, or a multicyclic, fused ring, polyvalent hydrocarbyl- or heterohydrocarbyl-group, such as naphthalene-1,8-diyl.

Preferred examples of the foregoing polyvalent Lewis base complexes include:

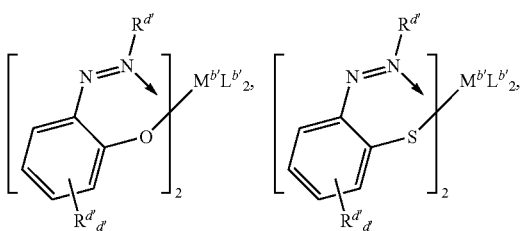

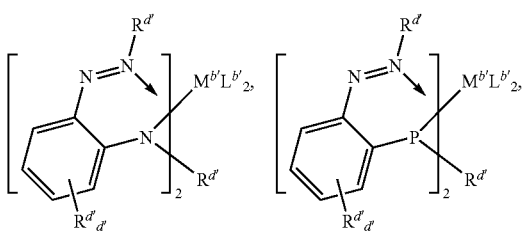

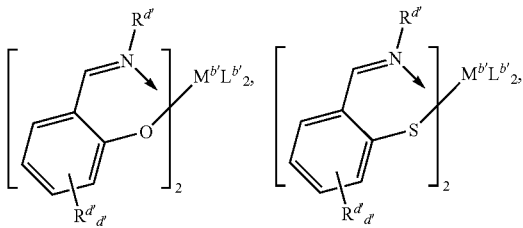

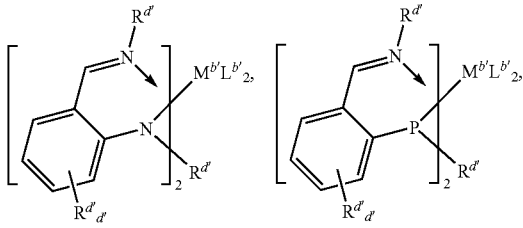

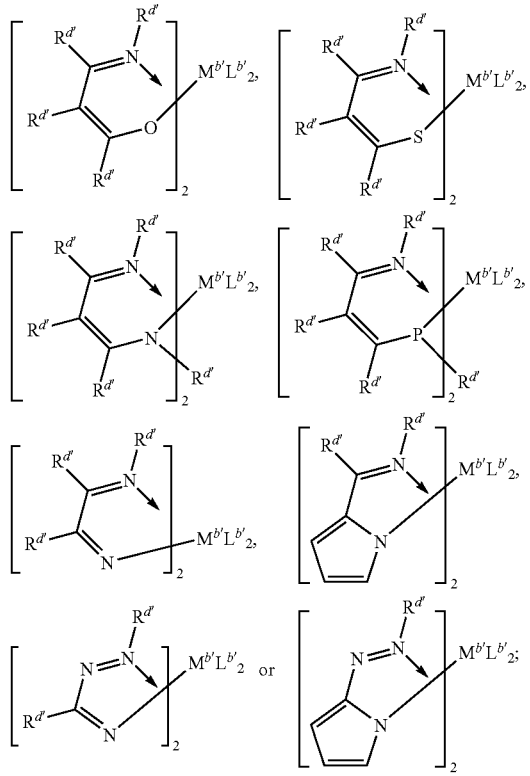

wherein $R^{d'}$ each occurrence is independently selected from the group consisting of hydrogen and $C_{1-50}$ hydrocarbyl groups optionally containing one or more heteroatoms, or inertly substituted derivative thereof, or further optionally, two adjacent $R^{d'}$ groups may together form a divalent bridging group;

d' is 4;

$M^{b'}$ is a Group 4 metal, preferably titanium or hafnium, or a Group 10 metal, preferably Ni or Pd;

$L^{b'}$ is a monovalent ligand of up to 50 atoms not counting hydrogen, preferably halide or hydrocarbyl, or two $L^{b'}$ groups together are a divalent or neutral ligand group, preferably a $C_{2-50}$ hydrocarbylene, hydrocarbadiyl or diene group.

The polyvalent Lewis base complexes for use in the present invention include Group 4 metal derivatives, especially hafnium derivatives, of hydrocarbylamine substituted heteroaryl compounds, said complexes corresponding to the formula:

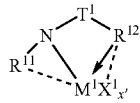

wherein:

$R^{11}$ is selected from alkyl, cycloalkyl, heteroalkyl, cycloheteroalkyl, aryl, and inertly substituted derivatives thereof containing from 1 to 30 atoms not counting hydrogen or a divalent derivative thereof;

$T^1$ is a divalent, chiral bridging group of from 1 to 41 atoms other than hydrogen, preferably 1 to 20 atoms other than hydrogen, and most preferably a mono- or di-$C_{1-20}$ hydrocarbyl substituted methylene or silane group; and $R^{12}$ is a $C_{5-20}$ heteroaryl group containing Lewis base functionality, especially a pyridin-2-yl- or substituted pyridin-2-yl group or a divalent derivative thereof;

$M^1$ is a Group 4 metal, preferably hafnium;

$X^1$ is an anionic, neutral or dianionic ligand group;

x' is a number from 0 to 5 indicating the number of such $X^1$ groups; and covalent bonds, optional bonds and electron donative interactions are represented by lines, dotted lines and arrows respectively. Desirably, the foregoing complexes include at least one chiral carbon or silicon atom.

Preferred complexes are those wherein ligand formation results from hydrogen elimination from the amine group and optionally from the loss of one or more additional groups, especially from $R^{12}$. In addition, electron donation from the Lewis base functionality, preferably an electron pair, provides additional stability to the metal center. Preferred metal complexes correspond to the formula:

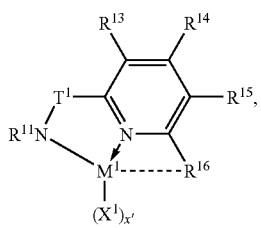

wherein $M^1$, $X^1$, x', $R^{11}$ and $T^{11}$ are as previously defined, $R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, $R^{15}$ or $R^{16}$ groups may be joined together thereby forming fused ring derivatives, and covalent bonds, optional bonds and electron pair donative interactions are represented by lines, dotted lines and arrows respectively.

More preferred examples of the foregoing metal complexes correspond to the formula:

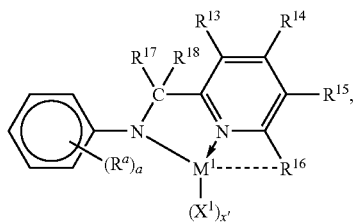

wherein $M^1$, $X^1$, and x' are as previously defined, $R^{13}$, $R^{14}$, $R^{15}$ and $R^{16}$ are as previously defined, preferably $R^{13}$, $R^{14}$, and $R^{15}$ are hydrogen, or $C_{1-4}$ alkyl, and $R^{16}$ is $C_{6-20}$ aryl, most preferably naphthalenyl;

$R^a$ independently each occurrence is $C_{1-4}$ alkyl, and a is 1-5, most preferably $R^a$ in two ortho-positions to the nitrogen is isopropyl or t-butyl;

$R^{17}$ and $R^{18}$ are different ligands, selected from the group consisting of hydrogen, halogen, or a $C_{1-20}$ alkyl or aryl group, most preferably one of $R^{17}$ and $R^{18}$ is hydrogen and the other is a $C_{6-20}$ aryl group, especially 2-isopropyl, phenyl or a fused polycyclic aryl group, most preferably an anthracenyl group, and covalent bonds, optional bonds and electron pair donative interactions are represented by lines, dotted lines and arrows respectively.

Highly preferred metal complexes for use herein correspond to the formula:

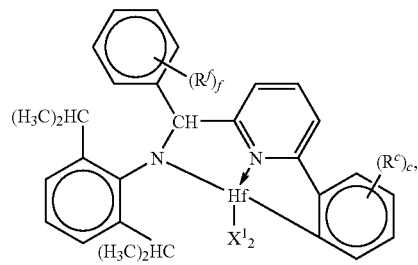

wherein $X^1$ each occurrence is halide, N,N-dimethylamido, or $C_{1-4}$ alkyl, and preferably each occurrence $X^1$ is methyl;

$R^f$ independently each occurrence is hydrogen, halogen, $C_{1-20}$ alkyl, or $C_{6-20}$ aryl, or two adjacent $R^f$ groups are joined together thereby forming a ring, and f is 1-5; and $R^c$ independently each occurrence is hydrogen, halogen, $C_{1-20}$ alkyl, or $C_{6-20}$ aryl, or two adjacent $R^c$ groups are joined together thereby forming a ring, and c is 1-5.

Additional examples of metal complexes for use according to the present invention are complexes of the following formulas:

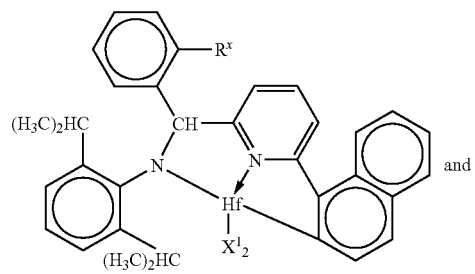

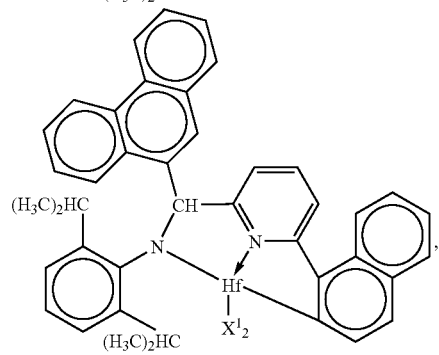

wherein $R^x$ is $C_{1-4}$ alkyl or cycloalkyl, preferably methyl, isopropyl, t-butyl or cyclohexyl; and $X^1$ each occurrence is halide, N,N-dimethylamido, or $C_{1-4}$ alkyl, preferably methyl.

Examples of metal complexes of the foregoing type include:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)] hafnium dimethyl;

[N-(2,6-di(1-methylethyl)phenyl)amido)(2-isopropylphenyl)(α-naphthalen-2-diyl(6-pyridin-2-diyl)methane)] hafnium di(N,N-dimethylamido);

[N-(2,6-di(1-methylethyl)phenyl)amido)(2-isopropylphenyl)(α-naphthalen-2-diyl(6-pyridin-2-diyl)methane)] hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)(α-naphthalen-2-diyl(6-pyridin-2-diyl)methane)]hafnium di(N,N-dimethylamido); and

[N-(2,6-di(1-methylethyl)phenyl)amido)(phenanthren-5-yl)(α-naphthalen-2-diyl(6-pyridin-2-diyl)methane)]hafnium dichloride.

Under the reaction conditions used to prepare the metal complexes used in the present invention, the hydrogen of the 2-position of the α-naphthalene group substituted at the 6-position of the pyridin-2-yl group is subject to elimination, thereby uniquely forming metal complexes wherein the metal is covalently bonded to both the resulting amide group and to the 2-position of the α-naphthalenyl group, as well as stabilized by coordination to the pyridinyl nitrogen atom through the electron pair of the nitrogen atom.

Additional suitable metal complexes include compounds corresponding to the formula:

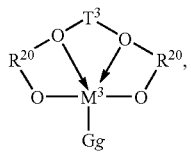

where:

$R^{20}$ is an aromatic or inertly substituted aromatic group containing from 5 to 20 atoms not counting hydrogen, or a polyvalent derivative thereof;

$T^3$ is a hydrocarbylene or silane group having from 1 to 20 atoms not counting hydrogen, or an inertly substituted derivative thereof;

$M^3$ is a Group 4 metal, preferably zirconium or hafnium;

G is an anionic, neutral or dianionic ligand group; preferably a halide, hydrocarbyl or dihydrocarbylamide group having up to 20 atoms not counting hydrogen;

g is a number from 1 to 5 indicating the number of such G groups; and covalent bonds and electron donative interactions are represented by lines and arrows respectively.

Preferably, such complexes correspond to the formula:

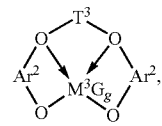

wherein:

$T^3$ is a divalent bridging group of from 2 to 20 atoms not counting hydrogen, preferably a substituted or unsubstituted, $C_{3-6}$ alkylene group; and $Ar^2$ independently each occurrence is an arylene or an alkyl- or aryl-substituted arylene group of from 6 to 20 atoms not counting hydrogen;

$M^3$ is a Group 4 metal, preferably hafnium or zirconium;

G independently each occurrence is an anionic, neutral or dianionic ligand group;

g is a number from 1 to 5 indicating the number of such X groups; and electron donative interactions are represented by arrows.

Examples of metal complexes of foregoing formula include the following compounds:

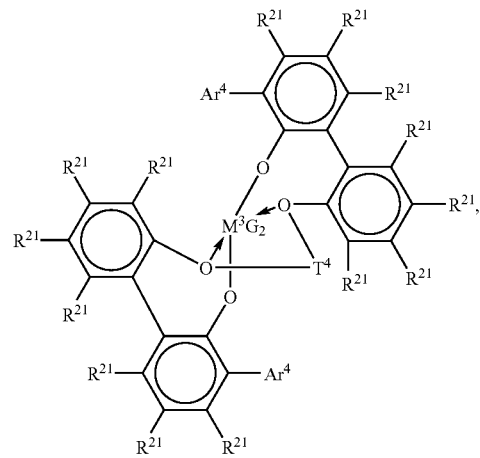

where $M^3$ is Hf or Zr;

$Ar^4$ is $C_{6-20}$ aryl or inertly substituted derivatives thereof, especially 3,5-di(isopropyl)phenyl, 3,5-di(isobutyl)phenyl, 3,5-di(t-butyl)phenyl, dibenzo-1H-pyrrole-1-yl, or anthracen-5-yl, and $T^4$ independently each occurrence comprises a $C_{3-6}$ alkylene group, a $C_{3-6}$ cycloalkylene group, or an inertly substituted derivative thereof;

$R^{21}$ independently each occurrence is hydrogen, halo, hydrocarbyl, trihydrocarbylsilyl, or trihydrocarbylsilylhydrocarbyl of up to 50 atoms not counting hydrogen; and G, independently each occurrence is halo or a hydrocarbyl or trihydrocarbylsilyl group of up to 20 atoms not counting hydrogen, or 2 G groups together are a divalent derivative of the foregoing hydrocarbyl or trihydrocarbylsilyl groups.

Additional suitable complexes are compounds of the formula:

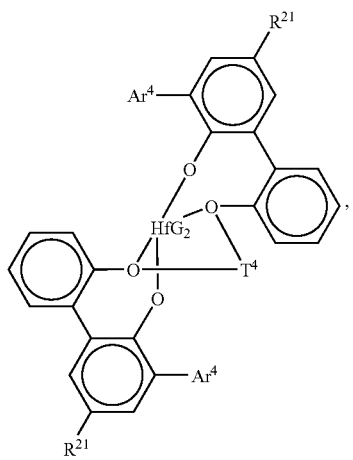

wherein Ar⁴ is 3,5-di(isopropyl)phenyl, 3,5-di(isobutyl)phenyl, dibenzo-1H-pyrrole-1-yl, or anthracen-5-yl, $R^{21}$ is hydrogen, halo, or $C_{1-4}$ alkyl, especially methyl T⁴ is propan-1,3-diyl, butan-1,4-diyl, cyclohexyl, dimethylene(cyclohexan-1,2-diyl), dimethylene(cyclohex-3-en-1,2-diyl), and G is chloro, methyl or benzyl.

Other suitable metal complexes are those of the formula:

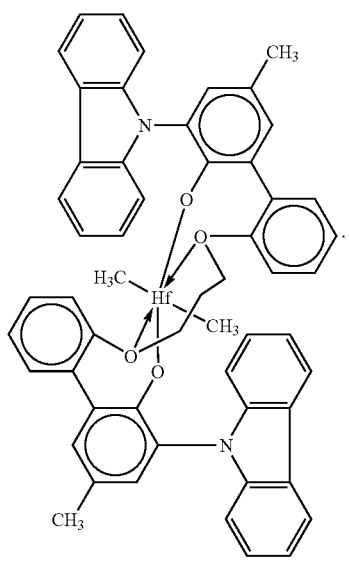

The foregoing polyvalent Lewis base complexes are conveniently prepared by standard metallation and ligand exchange procedures involving a source of the Group 4 metal and the neutral polyfunctional ligand source. In addition, the complexes may also be prepared by means of an amide elimination and hydrocarbylation process starting from the corresponding Group 4 metal tetraamide and a hydrocarbylating agent, such as trimethylaluminum. Other techniques may be used as well. These complexes are known from the disclosures of, among others, U.S. Pat. Nos. 6,320,005, 6,103,657, WO 02/38628, WO 03/40195, and US 04/0220050.

Additional suitable metal complexes include Group 4-10 metal derivatives corresponding to the formula:

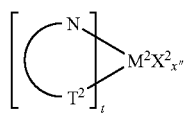

wherein
M² is a metal of Groups 4-10 of the Periodic Table of the elements, preferably Group 4 metals, Ni(II) or Pd(II), most preferably zirconium;

T² is a nitrogen, oxygen or phosphorus containing group;

X² is halo, hydrocarbyl, or hydrocarbyloxy;

t is one or two;

x" is a number selected to provide charge balance;

and T² and N are linked by a bridging ligand.

Such catalysts have been previously disclosed in *J. Am. Chem. Soc.*, 118, 267-268 (1996), *J. Am. Chem. Soc.*, 117, 6414-6415 (1995), and *Organometallics*, 16, 1514-1516, (1997), among other disclosures.

Preferred examples of the foregoing metal complexes are aromatic diimine or aromatic dioxyimine complexes of Group 4 metals, especially zirconium, corresponding to the formula:

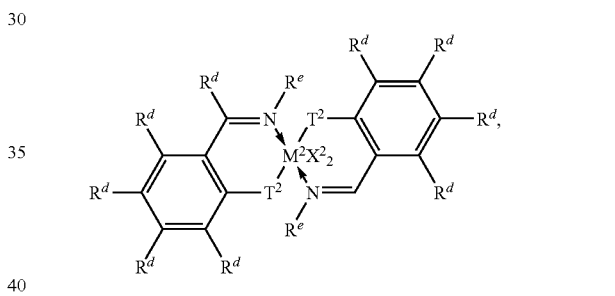

wherein;

M², X² and T² are as previously defined;

$R^d$ independently each occurrence is hydrogen, halogen, or $R^e$; and $R^e$ independently each occurrence is $C_{1-20}$ hydrocarbyl or a heteroatom-, especially a F, N, S or P-substituted derivative thereof, more preferably $C_{1-10}$ hydrocarbyl or a F or N substituted derivative thereof, most preferably alkyl, dialkylaminoalkyl, pyrrolyl, piperidenyl, perfluorophenyl, cycloalkyl, (poly)alkylaryl, or aralkyl.

Additional examples of metal complexes for use herein are aromatic dioxyimine complexes of zirconium, corresponding to the formula:

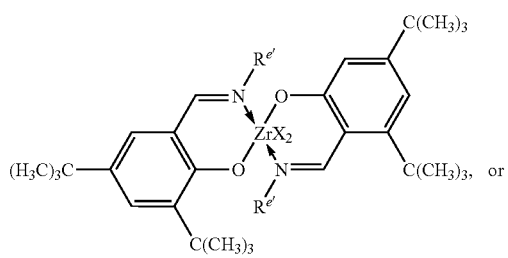

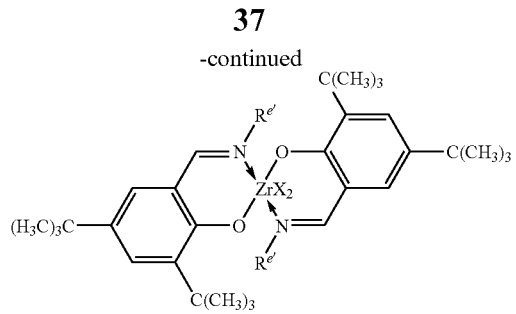

wherein;

$X^2$ is as previously defined, preferably $C_{1-10}$ hydrocarbyl, most preferably methyl or benzyl; and $R^{e'}$ is methyl, isopropyl, t-butyl, cyclopentyl, cyclohexyl, 2-methylcyclohexyl, 2,4-dimethylcyclohexyl, 2-pyrrolyl, N-methyl-2-pyrrolyl, 2-piperidenyl, N-methyl-2-piperidenyl, benzyl, o-tolyl, 2,6-dimethylphenyl, perfluorophenyl, 2,6-di(isopropyl)phenyl, or 2,4,6-trimethylphenyl.

The foregoing complexes also include certain phosphinimine complexes are disclosed in EP-A-890581. These complexes correspond to the formula: $[(R^f)_3—P=N]_fM(K^2)(R^f)_{3-f}$, wherein:

$R^f$ is a monovalent ligand or two $R^f$ groups together are a divalent ligand, preferably $R^f$ is hydrogen or $C_{1-4}$ alkyl;

M is a Group 4 metal, $K^2$ is a group containing delocalized π-electrons through which $K^2$ is bound to M, said $K^2$ group containing up to 50 atoms not counting hydrogen atoms, and f is 1 or 2.

Additional suitable metal complexes include metal complexes corresponding to the formula:

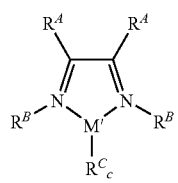

where M' is a metal of Groups 4-13, preferably Groups 8-10, most preferably Ni or Pd;

$R^A$, $R^B$ and $R^C$ are univalent or neutral substituents, which also may be joined together to form one or more divalent substituents, and c is a number chosen to balance the charge of the metal complex.

Preferred examples of the foregoing metal complexes for use as catalysts are compounds corresponding to the formula:

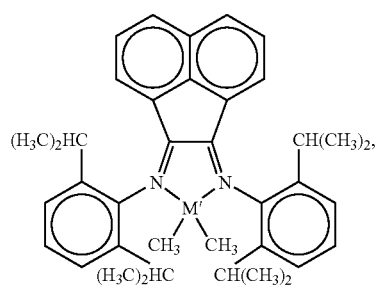

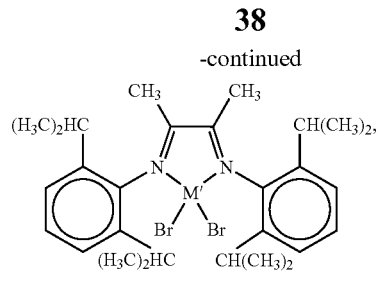

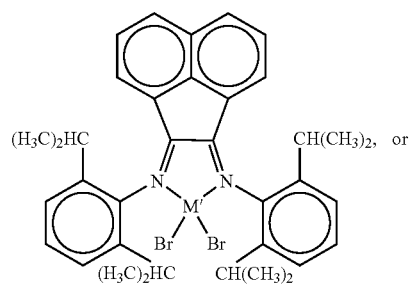

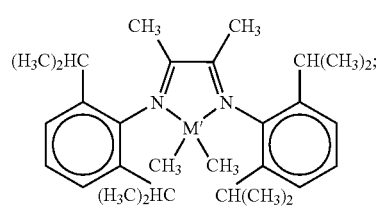

wherein M' is Pd or Ni.

Preferred examples of the foregoing metal complexes are compounds corresponding to the formulas:

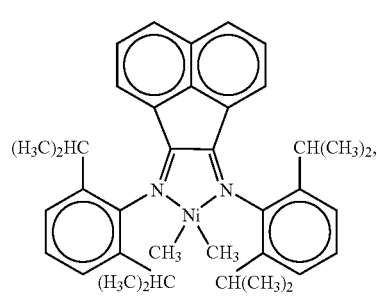

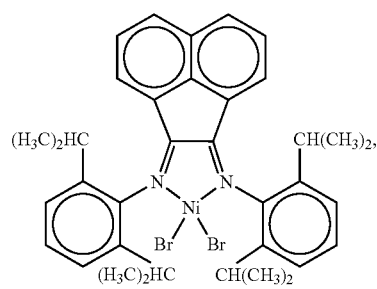

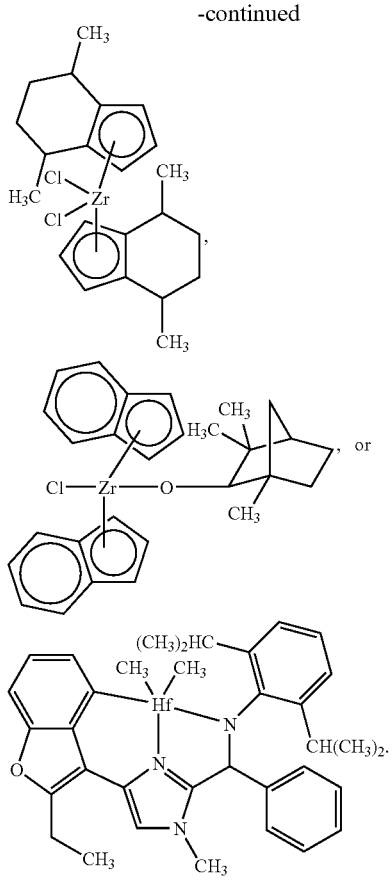

Metal complexes capable of increased 2,1-monomer insertion include compounds of the formulas:

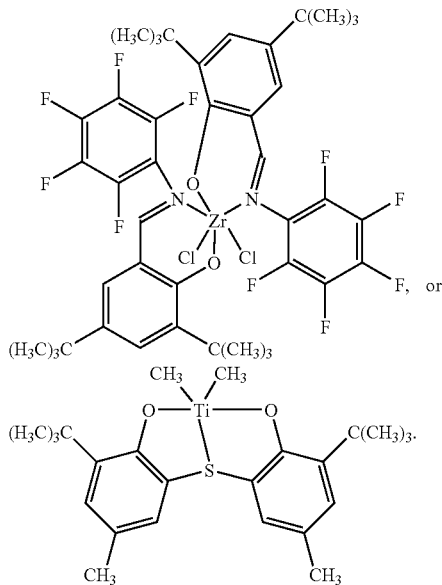

Through use of the foregoing metal complexes, regio-irregular branching may be induced in the multi-block copolymers by the use of catalysts that result in "chain-walking" in the resulting polymer. For example, certain homogeneous bridged bis indenyl- or partially hydrogenated bis indenyl- zirconium catalysts, disclosed by Kaminski, et al., *J. Mol. Catal. A: Chemical*, 102 (1995) 59-65; Zambelli, et al., *Macromolecules*, 1988, 21, 617-622; or Dias, et al., *J. Mol. Catal. A: Chemical*, 185 (2002) 57-64 may be used to prepare branched copolymers, including hyper-branched polymers, from single monomers. Higher transition metal catalysts, especially nickel and palladium catalysts are also known to lead to hyper-branched polymers (the branches of which are also branched) as disclosed in Brookhart, et al., *J. Am. Chem. Soc.*, 1995, 117, 64145-6415.

Especially desired metal complexes for preparation of tactic polymer segments herein are chiral, pyridyl amine- and imidazole amine-complexes of Group 4 metals, especially Hf. Methods for preparing such metal complexes have been previously disclosed in WO2005/904025, WO2005/904026, WO2005/904027, WO2004/099268, WO2003/40195, WO2004/24740, 2004US0220050, 2003US0204017, and *Angew. Chem. Int. Ed.*, 45, 3278-3283 (2006). Chirality results from the fact that the metal complex contains a ligand with an asymmetrically substituted carbon.

Examples of chiral metal complexes which are resolvable into pure enantiomers or non-racemic mixtures of such enantiomers for use herein include the previously discussed polyvalent Lewis base complexes containing an asymmetrically substituted carbon. Examples are metal complexes corresponding to the formula:

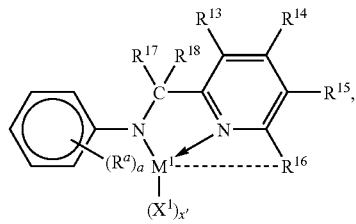

wherein $M^1$ is a Group 4 metal, preferably hafnium;

$X^1$ is an anionic, neutral or dianionic ligand group;

x' is a number from 0 to 5 indicating the number of such $X^1$ groups;

$R^{13}$, $R^{14}$, $R^{15}$ and $R^{16}$ are as previously defined, preferably $R^{13}$, $R^{14}$, and $R^{15}$ are hydrogen, or $C_{1-4}$ alkyl, and $R^{16}$ is $C_{6-20}$ aryl, most preferably naphthalenyl;

$R^a$ independently each occurrence is $C_{1-4}$ alkyl, and a is 1-5, most preferably $R^a$ in two ortho-positions to the nitrogen is isopropyl or t-butyl;

$R^{17}$ and $R^{18}$ are different ligand groups selected from hydrogen, halogen, or a $C_{1-20}$ alkyl or aryl group, thereby resulting in an asymmetrically substituted carbon center. Most preferably one of $R^{17}$ and $R^{18}$ is hydrogen and the other is a $C_{6-20}$ aryl group, especially 2-isopropylphenyl or a fused polycyclic aryl group, most preferably an anthracenyl group.

Highly preferred examples of the foregoing chiral metal complexes correspond to the formula:

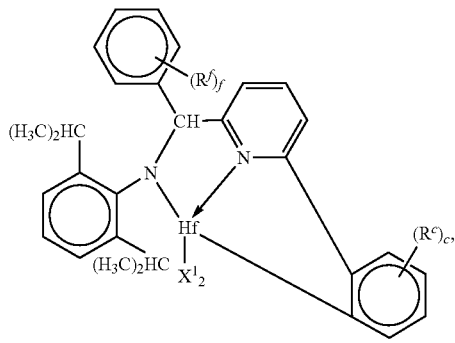

wherein $X^1$ each occurrence is halide, N,N-dimethylamido, or $C_{1-4}$ alkyl, and preferably each occurrence $X^1$ is methyl;

$R^f$ independently each occurrence is hydrogen, halogen, $C_{1-20}$ alkyl, $C_{6-20}$ aryl or alkyaryl, or two adjacent $R^f$ groups are joined together thereby forming a ring, and f is 1-5; and $R^c$ independently each occurrence is hydrogen, halogen, $C_{1-20}$ alkyl, or $C_{6-20}$ aryl, or two adjacent $R^c$ groups are joined together thereby forming a ring, and c is 1-5.

Additional examples of chiral metal complexes for use according to the present invention are complexes of the following formulas:

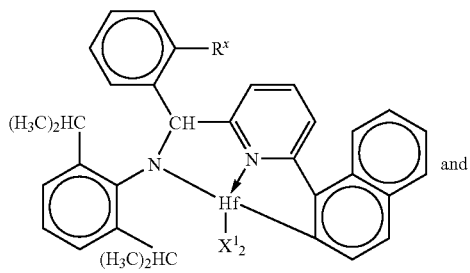

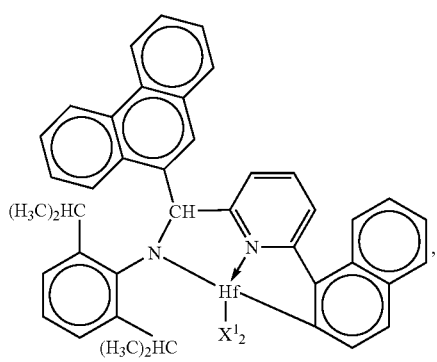

wherein Rx is $C_{1-4}$ alkyl or cycloalkyl, preferably methyl, isopropyl, t-butyl or cyclohexyl; and $X^1$ each occurrence is halide, N,N-dimethylamido, or $C_{1-4}$ alkyl, preferably methyl.

Additional suitable examples include the corresponding imidazolylamide or thiazole complexes of the formulas:

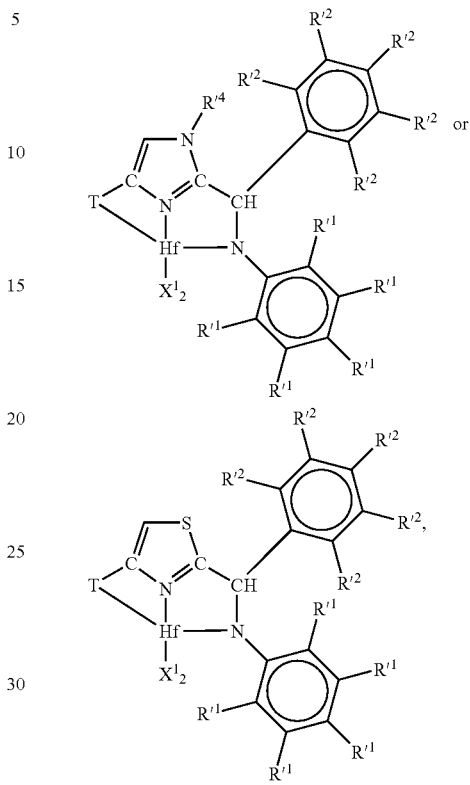

wherein $X^1$ is as previously defined, preferably $X^1$ each occurrence is a halide, $C_{1-20}$ hydrocarbyl, trihydrocarbylsilyl or trihydrocarbylsilylhydrocarbyl group;

T is a cycloaliphatic or aromatic group containing one or more rings;

$R^{t1}$ independently each occurrence is hydrogen, halogen, or a univalent, polyatomic anionic ligand, or two or more $R^{t1}$ groups are joined together thereby forming a polyvalent fused ring system;

$R^{t2}$ independently each occurrence is hydrogen, halogen, or a univalent, polyatomic anionic ligand, or two or more $R^{t2}$ groups are joined together thereby forming a polyvalent fused ring system; and $R^{t4}$ is hydrogen, alkyl, aryl, aralkyl, trihydrocarbylsilyl, or trihydrocarbylsilylmethyl of from 1 to 20 carbons.

Either the R— or the S-enantiomer, or a nonracemic mixture in which either the R— or the S-isomer predominates may be employed. Examples of chiral metal complexes of the foregoing type include the respective R- or S-enantiomers (or non-racemic mixtures) of pyridylamide or imidazolylamide complexes, including:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)] hafnium dimethyl;

[N-(2,6-di(1-methylethyl)phenyl)amido)(2-isopropylphenyl)(α-naphthalen-2-diyl(6-pyridin-2-diyl)methane)] hafnium di(N,N-dimethylamido);

[N-(2,6-di(1-methylethyl)phenyl)amido)(2-isopropylphenyl)(α-naphthalen-2-diyl(6-pyridin-2-diyl)methane)] hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)(α-naphthalen-2-diyl(6-pyridin-2-diyl)methane)]hafnium di(N,N-dimethylamido);

[N-(2,6-di(1-methylethyl)phenyl)amido)(phenanthren-5-yl)(α-naphthalen-2-diyl(6-pyridin-2-diyl)methane)]hafnium dichloride;

hafnium, [N-[2,6-bis(1-methylethyl)phenyl]-α-[2,4,6-tri(1-methylethyl)phenyl]-5-(2-ethylbenzofuran-3-yl-κ-$C^4$)-2-(N'-methyl)imidazol-2-yl)methanaminato(2-)-κ$N^1$,κ$N^2$]di(methyl), hafnium, [N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato(2-)-κ$N^1$,κ$N^2$]di(methyl), hafnium, [N-[2,6-bis(1-methylethyl)phenyl]-α-[2,4,6-tri(1-methylethyl)phenyl]-5-(carbazol-1-yl-κ-$C^2$)-2-(N'-methyl)imidazol-2-yl)methanaminato(2-)-κ$N^1$,κ$N^2$]di(methyl), hafnium, [N-[2,6-bis(1-methylethyl)phenyl]-α-[2,4,6-tri(1-methylethyl)phenyl]-5-(2-ethylbenzofuran-3-yl-κ-$C^4$)-2-(N'-methyl)imidazol-2-yl)methanaminato(2-)-κ$N^1$,κ$N^2$]di(benzyl), hafnium, [N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato(2-)-κ$N^1$,κ$N^2$]di(benzyl), hafnium, [N-[2,6-bis(1-methylethyl)phenyl]-α-[2,4,6-tri(1-methylethyl)phenyl]-5-(carbazol-1-yl-κ-$C^2$)-2-(N'-methyl)imidazol-2-yl)methanaminato(2-)-κ$N^1$,κ$N^2$]di(benzyl), and hafnium, [N-[2,6-bis(1-methylethyl)phenyl]-α-[2,6-di(1-methylethyl)phenyl]-5-(carbazol-1-yl-κ-$C^2$)-2-(N'-methyl)imidazol-2-yl)methanaminato(2-)-κ$N^1$,κ$N^2$]di(methyl).

By use of the present invention, incidental stereo-errors in the tactic polymer segment can be significantly reduced. Polymer tacticity, propylene content, regio-errors and other properties are determined by standard NMR techniques. Tacticities (mm) or (rr) are calculated based on meso- or regio-triads, and may be expressed as ratios less than one or as percents. Propylene isotacticity at the triad level (mm) is determined from the integrals of the mm triad (22.70-21.28 ppm), the mr triad (21.28-20.67 ppm) and the rr triad (20.67-19.74). The mm isotacticity is determined by dividing the intensity of the mm triad by the sum of the mm, mr, and rr triads. For ethylene containing interpolymers the mr region is corrected by subtracting the 37.5-39 ppm peak integral. For copolymers with other monomers that produce peaks in the regions of the mm, mr, and rr triads, the integrals for these regions are similarly corrected by subtracting the intensity of the interfering peak using standard NMR techniques, once the peaks have been identified. This can be accomplished, for example, by analysis of a series of copolymers of various levels of monomer incorporation, by literature assignments, by isotopic labeling, or other means which are known in the art. Desirably, such peaks represent no more than 5 mole percent of the tactic polymer segment, preferably no more than 3 mole percent, and most preferably no more than 1 mole percent.

Generally, the metal complex catalyst (also interchangeably referred to herein as procatalysts) may be activated to form the active catalyst composition by combination with a cocatalyst, preferably a cation forming cocatalyst comprising a relatively non-nucelophillic anion, a strong Lewis acid, or a combination thereof. In a preferred embodiment, the shuttling agent is employed both for purposes of chain shuttling and as the cocatalyst component of the catalyst composition.

The metal complexes desirably are rendered catalytically active by combination with a cation forming cocatalyst, such as those previously known in the art for use with Group 4 metal olefin polymerization complexes. Suitable cation forming cocatalysts for use herein include neutral Lewis acids, such as $C_{1-30}$ hydrocarbyl substituted Group 13 compounds, especially tri(hydrocarbyl)aluminum- or tri(hydrocarbyl)boron compounds and halogenated (including perhalogenated) derivatives thereof, having from 1 to 10 carbons in each hydrocarbyl or halogenated hydrocarbyl group, more especially perfluorinated tri(aryl)boron compounds, and most especially tris(pentafluoro-phenyl)borane; nonpolymeric, compatible, noncoordinating, ion forming compounds (including the use of such compounds under oxidizing conditions), especially the use of ammonium-, phosphonium-, oxonium-, carbonium-, silylium- or sulfonium-salts of compatible, noncoordinating anions, or ferrocenium-, lead- or silver salts of compatible, noncoordinating anions; and combinations of the foregoing cation forming cocatalysts and techniques. The foregoing activating cocatalysts and activating techniques have been previously taught with respect to different metal complexes for olefin polymerizations in the following references: EP-A-277,003, U.S. Pat. Nos. 5,153,157, 5,064,802, 5,321,106, 5,721,185, 5,350,723, 5,425,872, 5,625,087, 5,883,204, 5,919,983, 5,783,512, WO 99/15534, and WO99/42467.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris(pentafluorophenyl)borane with a polymeric or oligomeric alumoxane may be used as activating cocatalysts. Preferred molar ratios of metal complex:tris(pentafluorophenyl-borane:alumoxane are from 1:1:1 to 1:5:20, more preferably from 1:1:1.5 to 1:5:10.

Suitable ion forming compounds useful as cocatalysts in one embodiment of the present invention comprise a cation which is a Bronsted acid capable of donating a proton, and a noncoordinating anion, $A^-$. Preferred anions are those containing a single coordination complex comprising a charge-bearing metal or metalloid core which anion is capable of balancing the charge of the active catalyst species (the metal cation) which may be formed when the procatalyst and cocatalyst are combined. Also, said anion should be sufficiently labile to be displaced by olefinic, diolefinic and acetylenically unsaturated compounds or other neutral Lewis bases such as ethers or nitriles. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, well known and many, particularly such compounds containing a single boron atom in the anion portion, are available commercially.

Preferably such cocatalysts may be represented by the following general formula:

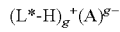

wherein:

L* is a neutral Lewis base;

(L*-H)⁺ is a conjugate Bronsted acid of L*;

$A^{g-}$ is a noncoordinating, compatible anion having a charge of g−, and g is an integer from 1 to 3.

More preferably $A^{g-}$ corresponds to the formula: $[M'Q_4]^-$;

wherein:

M' is boron or aluminum in the +3 formal oxidation state; and

Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), said Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

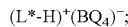

wherein:

L* is as previously defined;

B is boron in a formal oxidation state of 3; and

Q is a hydrocarbyl-, hydrocarbyloxy-, fluorinated hydrocarbyl-, fluorinated hydrocarbyloxy-, or fluorinated silylhydrocarbyl-group of up to 20 nonhydrogen atoms, with the proviso that in not more than one occasion is Q hydrocarbyl.

Preferred Lewis base salts are ammonium salts, more preferably trialkylammonium salts containing one or more $C_{12-40}$ alkyl groups. Most preferably, Q is each occurrence a fluorinated aryl group, especially, a pentafluorophenyl group.

Illustrative, but not limiting, examples of boron compounds which may be used as an activating cocatalyst in the preparation of the improved catalysts of this invention are tri-substituted ammonium salts such as:

trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-dimethylanilinium n-butyltris(pentafluorophenyl)borate,
N,N-dimethylanilinium benzyltris(pentafluorophenyl)borate,
N,N-dimethylanilinium tetrakis(4-(t-butyldimethylsilyl)-2,3,5,6-tetrafluorophenyl)borate,
N,N-dimethylanilinium tetrakis(4-(triisopropylsilyl)-2,3,5,6-tetrafluorophenyl)borate,
N,N-dimethylanilinium pentafluorophenoxytris(pentafluorophenyl)borate,
N,N-diethylanilinium tetrakis(pentafluorophenyl)borate,
N,N-dimethyl-2,4,6-trimethylanilinium tetrakis(pentafluorophenyl)borate,
dimethyloctadecylammonium tetrakis(pentafluorophenyl)borate,
methyldioctadecylammonium tetrakis(pentafluorophenyl)borate, dialkyl ammonium salts such as:

di-(i-propyl)ammonium tetrakis(pentafluorophenyl)borate,
methyloctadecylammonium tetrakis(pentafluorophenyl)borate,
methyloctadodecylammonium tetrakis(pentafluorophenyl)borate, and
dioctadecylammonium tetrakis(pentafluorophenyl)borate;

tri-substituted phosphonium salts such as:

triphenylphosphonium tetrakis(pentafluorophenyl)borate,
methyldioctadecylphosphonium tetrakis(pentafluorophenyl)borate, and
tri(2,6-dimethylphenyl)phosphonium tetrakis(pentafluorophenyl)borate;

di-substituted oxonium salts such as:

diphenyloxonium tetrakis(pentafluorophenyl)borate,
di(o-tolyl)oxonium tetrakis(pentafluorophenyl)borate, and
di(octadecyl)oxonium tetrakis(pentafluorophenyl)borate;

di-substituted sulfonium salts such as:

di(o-tolyl)sulfonium tetrakis(pentafluorophenyl)borate, and
methylcotadecylsulfonium tetrakis(pentafluorophenyl)borate.

Preferred (L*-H)⁺ cations are methyldioctadecylammonium cations, dimethyloctadecylammonium cations, and ammonium cations derived from mixtures of trialkyl amines containing one or 2 $C_{14-18}$ alkyl groups.

Another suitable ion forming, activating cocatalyst comprises a salt of a cationic oxidizing agent and a noncoordinating, compatible anion represented by the formula:

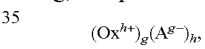

wherein:

$Ox^{h+}$ is a cationic oxidizing agent having a charge of h+;

h is an integer from 1 to 3; and $A^{g-}$ and g are as previously defined.

Examples of cationic oxidizing agents include: ferrocenium, hydrocarbyl-substituted ferrocenium, $Ag^+$, or $Pb^{+2}$. Preferred embodiments of $A^{g-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a noncoordinating, compatible anion represented by the formula:

wherein:

$[C]^+$ is a $C_{1-20}$ carbenium ion; and $A^-$ is a noncoordinating, compatible anion having a charge of −1. A preferred carbenium ion is the trityl cation, that is triphenylmethylium.

A further suitable ion forming, activating cocatalyst comprises a compound which is a salt of a silylium ion and a noncoordinating, compatible anion represented by the formula:

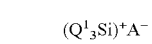

wherein:

$Q^1$ is $C_{1-10}$ hydrocarbyl, and $A^-$ is as previously defined.

Preferred silylium salt activating cocatalysts are trimethylsilylium tetrakispentafluorophenylborate, triethylsilylium tetrakispentafluorophenylborate and ether substituted adducts thereof. Silylium salts have been previously generically disclosed in *J. Chem. Soc. Chem. Comm.*, 1993, 383-384, as well as Lambert, J. B., et al., *Organometallics*, 1994, 13, 2430-2443. The use of the above silylium salts as activating cocatalysts for addition polymerization catalysts is disclosed in U.S. Pat. No. 5,625,087.

Certain complexes of alcohols, mercaptans, silanols, and oximes with tris(pentafluorophenyl)borane are also effective catalyst activators and may be used according to the present invention. Such cocatalysts are disclosed in U.S. Pat. No. 5,296,433.

Suitable activating cocatalysts for use herein also include polymeric or oligomeric alumoxanes, especially methylalumoxane (MAO), triisobutyl aluminum modified methylalumoxane (MMAO), or isobutylalumoxane; Lewis acid modified alumoxanes, especially perhalogenated tri(hydrocarbyl)aluminum- or perhalogenated tri(hydrocarbyl)boron modified alumoxanes, having from 1 to 10 carbons in each hydrocarbyl or halogenated hydrocarbyl group, and most especially tris(pentafluorophenyl)borane modified alumoxanes. Such cocatalysts are previously disclosed in U.S. Pat. Nos. 6,214,760, 6,160,146, 6,140,521, and 6,696,379.

A class of cocatalysts comprising non-coordinating anions generically referred to as expanded anions, further disclosed in U.S. Pat. No. 6,395,671, may be suitably employed to activate the metal complexes of the present invention for olefin polymerization. Generally, these cocatalysts (illustrated by those having imidazolide, substituted imidazolide, imidazolinide, substituted imidazolinide, benzimidazolide, or substituted benzimidazolide anions) may be depicted as follows:

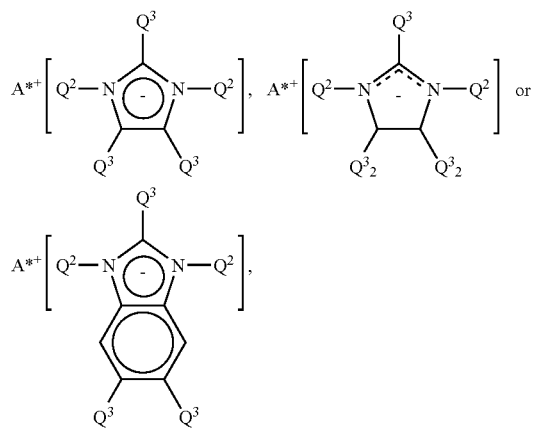

wherein:

$A^{*+}$ is a cation, especially a proton containing cation, and preferably is a trihydrocarbyl ammonium cation containing one or two $C_{10-40}$ alkyl groups, especially a methyldi ($C_{14-20}$ alkyl)ammonium cation, $Q^3$, independently each occurrence, is hydrogen or a halo, hydrocarbyl, halocarbyl, halohydrocarbyl, silylhydrocarbyl, or silyl, (including mono-, di- and tri(hydrocarbyl)silyl) group of up to 30 atoms not counting hydrogen, preferably $C_{1-20}$ alkyl, and $Q^2$ is tris(pentafluorophenyl)borane or tris(pentafluorophenyl)alumane).

Examples of these catalyst activators include trihydrocarbylammonium-salts, especially, methyldi($C_{14-20}$ alkyl)ammonium-salts of:

bis(tris(pentafluorophenyl)borane)imidazolide,
bis(tris(pentafluorophenyl)borane)-2-undecylimidazolide,
bis(tris(pentafluorophenyl)borane)-2-heptadecylimidazolide,
bis(tris(pentafluorophenyl)borane)-4,5-bis(undecyl)imidazolide,
bis(tris(pentafluorophenyl)borane)-4,5-bis(heptadecyl)imidazolide,
bis(tris(pentafluorophenyl)borane)imidazolinide,
bis(tris(pentafluorophenyl)borane)-2-undecylimidazolinide,
bis(tris(pentafluorophenyl)borane)-2-heptadecylimidazolinide,
bis(tris(pentafluorophenyl)borane)-4,5-bis(undecyl)imidazolinide,
bis(tris(pentafluorophenyl)borane)-4,5-bis(heptadecyl)imidazolinide,
bis(tris(pentafluorophenyl)borane)-5,6-dimethylbenzimidazolide,
bis(tris(pentafluorophenyl)borane)-5,6-bis(undecyl)benzimidazolide,
bis(tris(pentafluorophenyl)alumane)imidazolide,
bis(tris(pentafluorophenyl)alumane)-2-undecylimidazolide,
bis(tris(pentafluorophenyl)alumane)-2-heptadecylimidazolide,
bis(tris(pentafluorophenyl)alumane)-4,5-bis(undecyl)imidazolide,
bis(tris(pentafluorophenyl)alumane)-4,5-bis(heptadecyl)imidazolide,
bis(tris(pentafluorophenyl)alumane)imidazolinide,
bis(tris(pentafluorophenyl)alumane)-2-undecylimidazolinide,
bis(tris(pentafluorophenyl)alumane)-2-heptadecylimidazolinide,
bis(tris(pentafluorophenyl)alumane)-4,5-bis(undecyl)imidazolinide,
bis(tris(pentafluorophenyl)alumane)-4,5-bis(heptadecyl)imidazolinide,
bis(tris(pentafluorophenyl)alumane)-5,6-dimethylbenzimidazolide, and
bis(tris(pentafluorophenyl)alumane)-5,6-bis(undecyl)benzimidazolide.

Other activators include those described in PCT publication WO 98/07515 such as tris(2,2',2''-nonafluorobiphenyl)fluoroaluminate. Combinations of activators are also contemplated by the invention, for example, alumoxanes and ionizing activators in combinations, see for example, EP-A-0 573120, PCT publications WO 94/07928 and WO 95/14044 and U.S. Pat. Nos. 5,153,157 and 5,453,410. WO 98/09996 describes activating catalyst compounds with perchlorates, periodates and iodates, including their hydrates. WO 99/18135 describes the use of organoboroaluminum activators. WO 03/10171 discloses catalyst activators that are adducts of Bronsted acids with Lewis acids. Other activators or methods for activating a catalyst compound are described in for example, U.S. Pat. Nos. 5,849,852, 5,859,653, 5,869, 723, EP-A-615981, and PCT publication WO 98/32775. All of the foregoing catalyst activators as well as any other know activator for transition metal complex catalysts may be employed alone or in combination according to the present invention.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is typically employed in large quantity, generally at least 100 times the quantity of metal complex on a molar basis. Tris(pentafluorophenyl)borane, where used as an activating cocatalyst is employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

During the polymerization, the monomer or monomers are contacted with the activated catalyst composition according to any suitable polymerization conditions. The process is characterized by use of elevated temperatures and pressures. Hydrogen may be employed as a chain transfer agent for molecular weight control according to known techniques if desired. As in other similar polymerizations, it is highly desirable that the monomer(s) and solvents employed be of sufficiently high purity that significant catalyst deactivation does not occur. Any suitable technique for monomer purification such as devolatilization at reduced pressure, contacting with molecular sieves or high surface area alumina, or a combination of the foregoing processes may be employed. The skilled artisan will appreciate that the ratio of chain shuttling agent to one or more catalysts and or monomers in the process of the present invention may be varied in order to produce polymers differing in one or more chemical or physical properties. Solution, slurry, high pressure and gas phase polymerization processes may be employed.

The polymerization is desirably carried out as a continuous polymerization, preferably a continuous, solution polymerization, in which catalyst components, shuttling agent(s), monomer(s), and optionally solvent, adjuvants, scavengers, and polymerization aids are continuously supplied to the reaction zone and polymer product continuously removed there from. Within the scope of the terms "continuous" and "continuously" as used in this context are those processes in which there are intermittent additions of reactants and removal of products at small regular or irregular intervals, so that, over time, the overall process is substantially continuous.

For a solution polymerization process it is desirable to employ homogeneous dispersions of the catalyst components in a liquid diluent in which the polymer is soluble under the polymerization conditions employed. One such process utilizing an extremely fine silica or similar dispersing agent to produce such a homogeneous catalyst dispersion where either the metal complex or the cocatalyst is only poorly soluble is disclosed in U.S. Pat. No. 5,783,512. A solution process to prepare the novel polymers of the present invention, especially a continuous solution process is preferably carried out at a temperature between 80° C. and 250° C., more preferably between 100° C. and 210° C., and most preferably between 110° C. and 210° C. A high pressure process is usually carried out at temperatures from 100° C. to 400° C. and at pressures above 500 bar (50 MPa). A slurry process typically uses an inert hydrocarbon diluent and temperatures of from 0° C. up to a temperature just below the temperature at which the resulting polymer becomes substantially soluble in the inert polymerization medium. Preferred temperatures in a slurry polymerization are from 30° C., preferably from 60° C. up to 115° C., preferably up to 100° C. Pressures typically range from atmospheric (100 kPa) to 500 psi (3.4 MPa).

In all of the foregoing processes, continuous or substantially continuous polymerization conditions are preferably employed. The use of such polymerization conditions, especially continuous, solution polymerization processes employing two or more active polymerization catalyst species, allows the use of elevated reactor temperatures which results in the economical production of multi-block copolymers in high yields and efficiencies. Both well-mixed and plug-flow type reaction conditions may be employed. The latter conditions are preferred where tapering of the block composition is desired.

The catalyst compositions may be prepared as homogeneous compositions by addition of the metal complexes to a solvent in which the polymerization will be conducted or in a diluent compatible with the ultimate reaction mixture. The desired cocatalyst and the shuttling agent may be combined with the catalyst composition either prior to, simultaneously with, or after combination with the monomers to be polymerized and any additional reaction diluent.

At all times, the individual ingredients as well as any active catalyst composition must be protected from oxygen and moisture. Therefore, the catalyst components, shuttling agent and activated catalysts must be prepared and stored in an oxygen and moisture free atmosphere, preferably a dry, inert gas such as nitrogen.

Without limiting in any way the scope of the invention, one means for carrying out such a polymerization process is as follows. In a stirred-tank reactor, the monomers to be polymerized are introduced continuously together with any solvent or diluent. The reactor contains a liquid phase composed substantially of monomers together with any solvent or diluent and dissolved polymer. Preferred solvents include $C_{4-10}$ hydrocarbons or mixtures thereof, or halogenated compounds, especially alkanes such as hexane or mixtures of alkanes, as well as one or more of the monomers employed in the polymerization.

The mixture of two or more catalysts along with cocatalyst and chain shuttling agent (where employed) are continuously or intermittently introduced in the reactor liquid phase or any recycled portion thereof. The reactor temperature and pressure may be controlled by adjusting the solvent/monomer ratio, the catalyst addition rate, as well as by cooling or heating coils, jackets or both. The polymerization rate is controlled by the rate of catalyst addition. The comonomer content (if any) of the polymer product is determined by the ratio of major monomer to comonomer in the reactor, which is controlled by manipulating the respective feed rates of these components to the reactor. The polymer product molecular weight is controlled, optionally, by controlling other polymerization variables such as the temperature, monomer concentration, or by the previously mentioned chain transfer agent, as is well known in the art. Upon exiting the reactor, the effluent is contacted with a catalyst kill agent such as water, steam or an alcohol. The polymer solution is optionally heated, and the polymer product is recovered by flashing off gaseous monomers as well as residual solvent or diluent at reduced pressure, and, if necessary, conducting further devolatilization in equipment such as a devolatilizing extruder. In a continuous process the mean residence time of the catalyst and polymer in the reactor generally is from 5 minutes to 8 hours, and preferably from 10 minutes to 6 hours.

Alternatively, the foregoing polymerization may be carried out in a continuous loop reactor with or without a monomer, catalyst or shuttling agent gradient established between differing regions thereof, optionally accompanied by separated addition of catalysts and/or chain transfer agent, and operating under adiabatic or non-adiabatic solution polymerization conditions or combinations of the foregoing reactor conditions. Examples of suitable loop reactors and a variety of suitable operating conditions for use therewith are found in U.S. Pat. Nos. 5,977,251, 6,319,989 and 6,683,149.

Although not as desired, the catalyst composition may also be prepared and employed as a heterogeneous catalyst by adsorbing the requisite components on an inert inorganic or organic particulated solid, as previously disclosed. In an preferred embodiment, a heterogeneous catalyst is prepared by co-precipitating the metal complex and the reaction product of an inert inorganic compound and an active hydrogen containing activator, especially the reaction product of a tri ($C_{1-4}$ alkyl) aluminum compound and an ammonium salt of a hydroxyaryltris(pentafluorophenyl)borate, such as an ammonium salt of (4-hydroxy-3,5-ditertiarybutylphenyl)tris(pentafluorophenyl)borate. When prepared in heterogeneous or supported form, the catalyst composition may be employed in a slurry or a gas phase polymerization. As a practical limitation, slurry polymerization takes place in liquid diluents in which the polymer product is substantially insoluble. Preferably, the diluent for slurry polymerization comprises one or more hydrocarbons or halogenated hydrocarbons with from 3 to 10 carbon atoms. As with a solution polymerization, the monomer or a mixture of different monomers may be used in whole or part as the diluent. Most preferably at least a major part of the diluent comprises the monomers to be polymerized.

As previously mentioned, functionalized derivatives of multi-block copolymers are also included within the present invention. Examples include metallated polymers wherein the metal is the remnant of the catalyst or chain shuttling agent employed, as well as further derivatives thereof, for example, the reaction product of a metallated polymer with an oxygen source and then with water to form a hydroxyl terminated polymer. In another embodiment, sufficient air or other quench agent is added to cleave some or all of the shuttling agent-polymer bonds thereby converting at least a portion of the polymer to a hydroxyl terminated polymer. Additional examples include olefin terminated polymers formed by β-hydride elimination and ethylenic unsaturation in the resulting polymer.

In one embodiment of the invention the multi-block copolymer may be functionalized by maleation (reaction with maleic anhydride or its equivalent), metallation (such as with an alkyl lithium reagent, optionally in the presence of a Lewis base, especially an amine, such as tetramethylethylenediamine), or by incorporation of a diene or masked olefin in a copolymerization process. After polymerization involving a masked olefin, the masking group, for example a trihydrocarbylsilane, may be removed thereby exposing a more readily functionalized remnant. Techniques for functionalization of polymers are well known, and disclosed for example in U.S. Pat. No. 5,543,458, and elsewhere.

Because a substantial fraction of the polymeric product exiting the reactor can be terminated with the chain shuttling agent, further functionalization is relatively easy. The metallated polymer species can be utilized in well known chemical reactions such as those suitable for other alkyl-aluminum, alkyl-gallium, alkyl-zinc, or alkyl-Group 1 compounds to form amine-, hydroxy-, epoxy-, ketone-, ester-, nitrile- and other functionalized terminated polymer products. Examples of suitable reaction techniques that are adaptable for use herein are described in Negishi, "Organometallics in Organic Synthesis", Vol. 1 and 2, (1980), and other standard texts in organometallic and organic synthesis.

Utilizing the present process, multi-block copolymers are readily prepared having a variety of desirable physical properties. Tacticity, if any, in the resulting interpolymers may be measured using any suitable technique, with techniques based on nuclear magnetic resonance (NMR) spectroscopy preferred. It is highly desirable that some of the polymer blocks comprise an isotactic polymer, preferably a highly isotactic polypropylene or poly-4-methyl-1-pentene, and any remaining polymer blocks predominantly comprise ethylene/propylene copolymer or polymer containing regio-irregular 3,1-monomer insertions, essentially generating amorphous copolymer segments therein. Preferably the tactic segments or blocks are highly isotactic polypropylene or poly-4-methyl-1-pentene, especially homopolymers containing at least 99 mole percent propylene, 1-butene or 4-methyl-1-pentene therein. Further preferably, the amorphous polymer segments have Tg less than 25° C., preferably less than 0° C., more preferably less than –10° C., most preferably less than –25° C., and most highly preferably less than –30° C.

Additionally, the interpolymers of the invention preferably comprise from 5 to 95 percent tactic, crystalline or other relatively hard segments, and 95 to 5 percent amorphous or relatively soft polymer segments, more preferably from 10 to 90 percent crystalline or relatively hard segments and 90 to 10 percent amorphous or relatively amorphous segments (soft segments).

Regio-irregular branching in the polymers of the invention may also arise as a result of chain walking or other branch forming process as previously disclosed. In the instance where chain walking in the polymerization of a $C_{4-20}$ α-olefin occurs, the catalyst chain may "walk" to the terminal methyl unit of the monomer before inserting another monomer. Such insertions may include 1,ω- or 2,ω-insertions, and lead to either chain straightening or to differences in chain branching and/or lowered Tg in the segments containing the same. Specifically, 1,ω-insertions generally lead to a reduction in branching compared to a normal polymer. In addition, 2-ω insertions result in the formation of methyl branches. These insertions are included within the term "regio-irregular monomer insertion" or "regio-irregular branching" as used herein.

The polymers of the invention can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. Desirably, the invented polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the polymers desirably is from 0.80 to 0.99 g/cm³ and preferably from 0.85 g/cm³ to 0.97 g/cm³.

Additives and adjuvants may be included in any formulation comprising polymers of the present invention. Suitable additives include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils; stabilizers, anti-oxidants, colorants, extrusion aids, slip additives, release additives, and other natural and synthetic polymers, including other polymers according to the invention.

Analytical Techniques $^{13}C$ NMR Standard Method

Quantitative $^{13}C$ NMR spectra of polymer samples are recorded at 120° C., on 35 mg/mL solutions in tetrachloroethane-1,2-d₂, with a DRX 400 Avance™ spectrometer, available from Bruker Optics Corporation, operating at 100.6 MHz with a 5 mm probe, under the following conditions: 80° pulse; acquisition time, 2.7 s; relaxation delay, 2.5 s; >10K transients. Broad-band proton decoupling is achieved with a modified WALTZ16 sequence (BI_WALTZ16_32 by Bruker Optics Corporation). Resonance assigned is based on published values.

The spectra are fully simulated with the Shape2004™ software package, available from Burker Optics Corporation. For each sample, the stereosequence distribution is measured on regioregular chain segments far from the chain ends.

DSC Standard Method

Differential Scanning Calorimetry results are determined using a model Q1000 DSC, available from TAI, Owings Mills, Md., equipped with an RCS cooling accessory and an autosampler, or equivalent instrument. A nitrogen purge gas flow of 50 ml/minute is used. 3-10 mg Of material is accurately weighed, placed in a light aluminum pan weighing approximately 50 mg, and then crimped shut. The thermal behavior of the sample is investigated with the following temperature profile. The sample is rapidly heated to 180° C. and held isothermally for 3 minutes in order to remove any previous thermal history. The sample is then cooled to −40° C. at a cooling rate of 10° C./min. and held at −40° C. for 3 minutes. The sample is then heated to 150° C. at a heating rate of 10° C./min. The cooling and second heating curves are recorded.

The DSC melting peak is measured as the maximum in heat flow rate (W/g) with respect to the linear baseline drawn between −30° C. and the end of melting. The heat of fusion is measured as the area under the melting curve between −30° C. and the end of melting using a linear baseline. If the melting point of the sample is >150° C., then the temperature of the isothermal first heat and second heat is increased accordingly.

GPC Method for Determining Polymer Mn, Mw

Gel permeation chromatograms are made using a Model PL-210 or Model PL-220 gel permeation instrument, available from Polymer Laboratories, or equivalent equipment. The column and carousel compartments are operated at 140° C. Three Polymer Laboratories 10-micron Mixed-B columns are used. The solvent is 1,2,4-trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.,* 6, 621 (1968)):
$M_{polyethylene} = 0.431(M_{polystyrene})$ Polyetheylene equivalent molecular weight calculations are performed using Viscotek TriSEC™ software Version 3.0, available from Viscotek Corporation, Houston, Tex.

Specific Embodiments

The following specific embodiments of the invention and combinations thereof are especially desirable and hereby delineated in order to provide detailed disclosure for the appended claims.

1. A process for forming a high molecular weight, multi-block copolymer, said copolymer containing therein two or more chemically distinguishable segments or blocks, at least one of which comprises a tactic polymer, the process comprising polymerizing one or more olefin monomers, at least one of which is capable of forming a tactic polymer, in the presence of a chain shuttling agent and a catalyst composition comprising:

two or more olefin polymerization catalysts capable of preparing polymers having differing chemical or physical properties under equivalent polymerization conditions, or at least one olefin polymerization catalyst containing multiple active catalyst sites capable of preparing polymers having differing chemical or physical properties;

characterized in that at least one of the olefin polymerization catalysts comprises a metal complex containing at least one asymmetrically substituted (chiral) carbon atom, said metal complex being present in the form of a non-racemic mixture of the R- and S-enantiomers thereof.

2. A process according to embodiment 1 wherein the compound containing a chiral carbon atom corresponds to the formula:

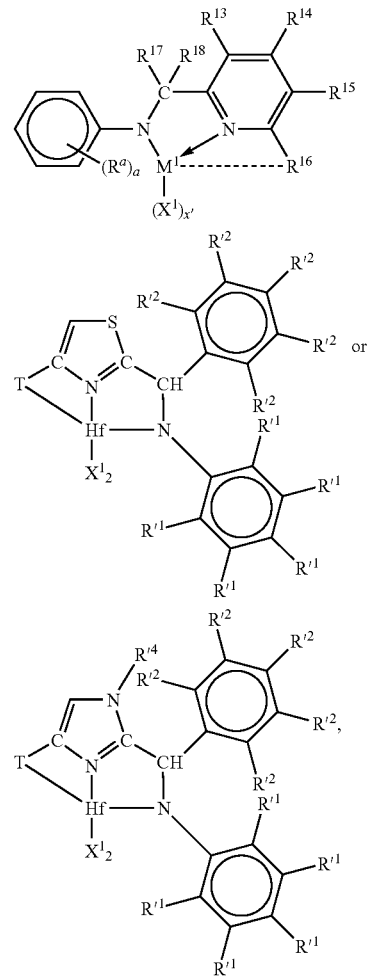

wherein
$M^1$ is a Group 4 metal, preferably hafnium;
$X^1$ is an anionic, neutral or dianionic ligand group;
x' is a number from 0 to 5 indicating the number of such $X^1$ groups
$R^{13}$, $R^{14}$, $R^{15}$ and $R^{16}$ are hydrogen, halo, or an alkyl, cycloalkyl, heteroalkyl, heterocycloalkyl, aryl, or silyl group of up to 20 atoms not counting hydrogen, or adjacent $R^{13}$, $R^{14}$, R$^{15}$ or R$^{16}$ groups may be joined together thereby forming fused ring derivatives, preferably R$^{13}$, R$^{14}$ and R$^{15}$ are hydrogen, or C$_{1-4}$ alkyl, and R$^{16}$ is C$_{6-20}$ aryl, most preferably naphthalenyl;

R$^a$ independently each occurrence is C$_{1-4}$ alkyl, and a is 1-5, most preferably R$^a$ in two ortho-positions to the nitrogen is isopropyl or t-butyl;

R$^{17}$ and R$^{18}$ are different ligand groups selected from hydrogen, halogen, or a C$_{1-20}$ alkyl or aryl group, thereby resulting in an asymmetrically substituted carbon center. Preferably one of R$^{17}$ and R$^{18}$ is hydrogen and the other is a C$_{6-20}$ aryl group, especially phenanthrenyl or a fused polycyclic aryl group, most preferably a 2-isopropylphenyl group.

T is a cycloaliphatic or aromatic group containing one or more rings;

R'$^1$ independently each occurrence is hydrogen, halogen, or a univalent, polyatomic anionic ligand, or two or more R'$^1$ groups are joined together thereby forming a polyvalent fused ring system;

R'$^2$ independently each occurrence is hydrogen, halogen, or a univalent, polyatomic anionic ligand, or two or more R'$^2$ groups are joined together thereby forming a polyvalent fused ring system; and R'$^4$ is hydrogen, alkyl, aryl, aralkyl, trihydrocarbylsilyl, or trihydrocarbylsilylmethyl of from 1 to 20 carbons.

3. A process according to embodiment 1 wherein the compound containing a chiral center is selected from:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)] hafnium dimethyl;

[N-(2,6-di(1-methylethyl)phenyl)amido)(2-isopropylphenyl)(α-naphthalen-2-diyl(6-pyridin-2-diyl)methane)] hafnium di(N,N-dimethylamido);

[N-(2,6-di(1-methylethyl)phenyl)amido)(2-isopropylphenyl)(α-naphthalen-2-diyl(6-pyridin-2-diyl)methane)] hafnium dichloride;

[N-(2,6-di(1-methylethyl)phenyl)amido)(phenanthren-5-yl)(α-naphthalen-2-diyl(6-pyridin-2-diyl)methane)]hafnium dimethyl;

[N-(2,6-di(1-methylethyl)phenyl)amido)(phenanthren-5-yl)(α-naphthalen-2-diyl(6-pyridin-2-diyl)methane)]hafnium di(N,N-dimethylamido);

[N-(2,6-di(1-methylethyl)phenyl)amido)(phenanthren-5-yl)(α-naphthalen-2-diyl(6-pyridin-2-diyl)methane)]hafnium dichloride;

hafnium, [N-[2,6-bis(1-methylethyl)phenyl]-α-[2,4,6-tri(1-methylethyl)phenyl]-5-(2-ethylbenzofuran-3-yl-κ-C$^4$)-2-(N'-methyl)imidazol-2-yl)methanaminato(2-)-κN$^1$,κN$^2$]di(methyl), hafnium, [N-[2,6-bis(1-methylethyl)phenyl]-α-[2,6-di(1-methylethyl)phenyl]-5-(2-ethylbenzofuran-3-yl-κ-C$^4$)-2-(N'-methyl)imidazol-2-yl)methanaminato(2-)-κN$^1$,κN$^2$]di(methyl), hafnium, [N-[2,6-bis(1-methylethyl)phenyl]-α-[2,4,6-tri(1-methylethyl)phenyl]-5-(carbazol-1-yl-κ-C$^2$)-2-(N'-methyl)imidazol-2-yl)methanaminato(2-)-κN$^1$,κN$^2$]di(methyl), hafnium, [N-[2,6-bis(1-methylethyl)phenyl]-α-[2,4,6-tri(1-methylethyl)phenyl]-5-(2-ethylbenzofuran-3-yl-κ-C$^4$)-2-(N'-methyl)imidazol-2-yl)methanaminato(2-)-κN$^1$,κN$^2$]di(benzyl), hafnium, [N-[2,6-bis(1-methylethyl)phenyl]-α-[2,6-di(1-methylethyl)phenyl]-5-(2-ethylbenzofuran-3-yl-κ-C$^4$)-2-(N'-methyl)imidazol-2-yl)methanaminato(2-)-κN$^1$,κN$^2$]di(benzyl), hafnium, [N-[2,6-bis(1-methylethyl)phenyl]-α-[2,4,6-tri(1-methylethyl)phenyl]-5-(carbazol-1-yl-κ-C$^2$)-2-(N'-methyl)imidazol-2-yl)methanaminato(2-)-κN$^1$,κN$^2$]di(benzyl), and hafnium, [N-[2,6-bis(1-methylethyl)phenyl]-α-[2,6-di(1-methylethyl)phenyl]-5-(carbazol-1-yl-κ-C$^2$)-2-(N'-methyl)imidazol-2-yl)methanaminato(2-)-κN$^1$,κN$^2$]di(methyl).

4. A process according to embodiment 1 wherein propylene is polymerized or copolymerized with ethylene, one or more C$_{4-8}$ α-olefins, and/or a conjugated or non-conjugated diene.

5. A process according to embodiment 1 wherein the polymerization is conducted in the presence of a polar, aprotic compound.

6. A process according to embodiment 5 wherein the polar, aprotic compound is selected from the group consisting of o-xylene, ethylbenzene, 1,2,3-trimethylbenzene, 1,2,4-trimethylbenzene, 1,3,5-trimethylbenzene, isopropylbenzene, 1-methyl-2-ethylbenzene, 1,2-diethylbenzene, chlorobenzene, o-dichlorobenzene, chlorotoluene, 1-chloroethane, dichloromethane, 1,2-dichloroethane, 1-chloroethene, 1-chloropropane, 1,1-dichloroethane, 1-chlorobutane, 1-chloropentane, 1-chlorohexane, 1,1,1-trifluoroethane, difluoromethane, trifluoromethane, 1,1-difluoroethane, 1,1,1-trifluororethane, 1,1,1,2-tetrafluoroethane, 1,1,1-trifluoropropane, 1,1,1-trifluorobutane, 1,1,1-trifluoropentane, 1,1,1-trifluorohexane, 1,1,1,3,3-pentafluoropropane, 1,1,1,3,3-pentafluorobutane, fluorocyclobutane, difluorocyclobutane, trifluorocyclobutane, pentafluorocyclobutane, fluorocyclohexane, 1,2-difluorocyclohexane, 1,3-difluorocyclohexane, fluorobenzene, o-difluorobenzene, m-difluorobenzene, p-difluorobenzene, fluorotoluene, difluorotoluene, 1-chloro-1-fluoroethane, 1,2-dichlorofluororethane, dichlorofluoromethane, difluorochloromethane, 2-trifluoromethylpropane, tetrahydrofuran, methyl t-butyl ether, 2-butanone, diethylether, 1,2-dimethoxyethane, ethylene glycol dibutyl ether; diethylene glycol dimethyl ether, diethylene glycol dibutyl ether, dichloromethane, 1,4-dioxane, chloroform, sulfolane, dimethylformamide, and dimethylether.

7. A process according to embodiment 1 which is a continuous, solution polymerization.

8. A process according to embodiment 1 conducted at a temperature from 70 to 200° C.

9. A process according to embodiment 1 wherein the shuttling agent is a trihydrocarbyl aluminum or dihydrocarbyl zinc-compound containing from 1 to 12 carbons in each hydrocarbyl group.

10. A process according to any one of embodiments 1-9 wherein the metal complex is present in the form of the substantially pure R- or S-enantiomer thereof.

11. A process for forming a high molecular weight, multi-block copolymer, said copolymer containing therein two or more chemically distinguishable segments or blocks, at least one of which comprises a tactic polymer, the process comprising polymerizing one or more olefin monomers, at least one of which is capable of forming a tactic polymer, in the presence of a chain shuttling agent and a catalyst composition comprising:

two or more olefin polymerization catalysts capable of preparing polymers having differing chemical or physical properties under equivalent polymerization conditions, or at least one olefin polymerization catalyst containing multiple active catalyst sites capable of preparing polymers having differing chemical or physical properties;

characterized in that at least one of the olefin polymerization catalysts comprises a metal complex containing at least one asymmetrically substituted carbon atom, said metal complex being present in the form of a non-racemic mixture of the R- or S-enantiomers thereof.

12. A process according to embodiment 11 wherein the metal complex is present in the form of the substantially pure R- or S-enantiomer thereof.

13. A process for forming a high molecular weight, tactic polymer, the process comprising polymerizing one or more olefin monomers, at least one of which is capable of forming a tactic polymer in the presence of a chain shuttling agent and a catalyst composition comprising a metal complex containing multiple active catalyst sites capable of preparing polymers having differing chemical or physical properties, characterized in that the metal complex contains at least one asymmetrically substituted carbon atom, said metal complex being present in the form of a non-racemic mixture of the R- or S-enantiomers thereof.

14. A process according to embodiment 13 wherein the metal complex is present in the form of the substantially pure R- or S-enantiomer thereof.

15. A process according to embodiment 13 or 14 wherein the polymerization is conducted in a polar, aprotic, organic liquid having a dielectric constant greater than 2.4, preferably greater than or equal to 2.8, most preferably greater than or equal to 3.0.

16. A process according to embodiments 15 wherein the polar, aprotic organic liquid is selected from the group consisting of o-xylene, ethylbenzene, 1,2,3-trimethylbenzene, 1,2,4-trimethylbenzene, 1,3,5-trimethylbenzene, isopropylbenzene, 1-methyl-2-ethylbenzene, 1,2-diethylbenzene, chlorobenzene, o-dichlorobenzene, chlorotoluene, 1-chloroethane, dichloromethane, 1,2-dichloroethane, 1-chloroethene, 1-chloropropane, 1,1-dichloroethane, 1-chlorobutane, 1-chloropentane, 1-chlorohexane, 1,1,1-trifluoroethane, difluoromethane, trifluoromethane, 1,1-difluoroethane, 1,1,1-trifluororethane, 1,1,1,2-tetrafluoroethane, 1,1,1-trifluoropropane, 1,1,1-trifluorobutane, 1,1,1-trifluoropentane, 1,1,1-trifluorohexane, 1,1,1,3,3-pentafluoropropane, 1,1,1,3,3-pentafluorobutane, fluorocyclobutane, difluorocyclobutane, trifluorocyclobutane, pentafluorocyclobutane, fluorocyclohexane, 1,2-difluorocyclohexane, 1,3-difluorocyclohexane, fluorobenzene, o-difluorobenzene, m-difluorobenzene, p-difluorobenzene, fluorotoluene, difluorotoluene, 1-chloro-1-fluoroethane, 1,2-dichlorofluororethane, dichlorofluoromethane, difluorochloromethane, 2-trifluoromethylpropane, tetrahydrofuran, methyl t-butyl ether, 2-butanone, diethylether, 1,2-dimethoxyethane, ethylene glycol dibutyl ether; diethylene glycol dimethyl ether, diethylene glycol dibutyl ether, dichloromethane, 1,4-dioxane, chloroform, sulfolane, dimethylformamide, and dimethylether.

17. A process for forming a high molecular weight, tactic polymer, the process comprising polymerizing one or more olefin monomers, at least one of which is capable of forming a tactic polymer, said process being conducted in the presence of a polar, aprotic, organic liquid compound having a dielectric constant greater than 2.4 and a catalyst composition comprising a metal complex containing at least one asymmetrically substituted carbon atom, said metal complex being present in the form of a non-racemic mixture of the R- or S-enantiomers thereof.

18. A process according to embodiment 17 wherein the metal complex is present in the form of the substantially pure R- or S-enantiomer thereof.

19. A process according to any one of embodiments 17 or 18 wherein the polar, aprotic organic liquid is selected from the group consisting of o-xylene, ethylbenzene, 1,2,3-trimethylbenzene, 1,2,4-trimethylbenzene, 1,3,5-trimethylbenzene, isopropylbenzene, 1-methyl-2-ethylbenzene, 1,2-diethylbenzene, chlorobenzene, o-dichlorobenzene, chlorotoluene, 1-chloroethane, dichloromethane, 1,2-dichloroethane, 1-chloroethene, 1-chloropropane, 1,1-dichloroethane, 1-chlorobutane, 1-chloropentane, 1-chlorohexane, 1,1,1-trifluoroethane, difluoromethane, trifluoromethane, 1,1-difluoroethane, 1,1,1-trifluororethane, 1,1,1,2-tetrafluoroethane, 1,1,1-trifluoropropane, 1,1,1-trifluorobutane, 1,1,1-trifluoropentane, 1,1,1-trifluorohexane, 1,1,1,3,3-pentafluoropropane, 1,1,1,3,3-pentafluorobutane, fluorocyclobutane, difluorocyclobutane, trifluorocyclobutane, pentafluorocyclobutane, fluorocyclohexane, 1,2-difluorocyclohexane, 1,3-difluorocyclohexane, fluorobenzene, o-difluorobenzene, m-difluorobenzene, p-difluorobenzene, fluorotoluene, difluorotoluene, 1-chloro-1-fluoroethane, 1,2-dichlorofluororethane, dichlorofluoromethane, difluorochloromethane, 2-trifluoromethylpropane, tetrahydrofuran, methyl t-butyl ether, 2-butanone, diethylether, 1,2-dimethoxyethane, ethylene glycol dibutyl ether; diethylene glycol dimethyl ether, diethylene glycol dibutyl ether, dichloromethane, 1,4-dioxane, chloroform, sulfolane, dimethylformamide, and dimethylether.

The skilled artisan will appreciate that the invention disclosed herein may be practiced in the absence of any component, step or ingredient which has not been specifically disclosed.

EXAMPLES

The following example is provided as further illustration of the invention and is not to be construed as limiting. The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from Exxon Mobil Chemicals Inc. In the event the name of a compound herein does not conform to the structural representation thereof, the structural representation shall control. The synthesis of all metal complexes and the preparation of all screening experiments are carried out in a dry nitrogen atmosphere using dry box techniques. All solvents used are HPLC grade and are dried before their use.

Racemic Hafnium, [N-[2,6-bis(1-methylethyl)phenyl]-α-(2-methylphenyl)-6-(1-naphthanlenyl-κ-$C^2$)-2-pyridine-methaneaminato(2-)-κ$N^1$,κ$N^2$]dimethyl
(Rac-1)

This complex is prepared according to the teachings of WO 2003/040195, WO/2004/024740, WO 2004/099268, and U.S. Pat. No. 6,953,764.

(R)-Hafnium, [N-[2,6-bis(1-methylethyl)phenyl]-α-[2-(1-methyl)phenyl]-6-(1-naphthanlenyl-κ-C²)-2-pyridinemethanaminato(2-)-κN¹,κN²]dimethyl-(R1)

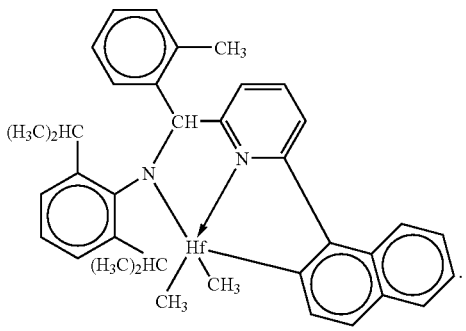

In a 1000 mL round-bottomed flask equipped with a small magnetic stir-bar is placed 21.3 g (43.7 millimoles) of rac-2-pyridinemethanamine, N-[2,6-bis(1-methylethyl)phenyl]-α-[2-(1-methyl)phenyl]-6-(1-naphthanlenyl). 10.2 g (43.7 Millimoles) of (+)-(1S)-camphor-10-sulphonic acid are added along with 500 mL of THF. The mixture is stirred until all of the solids are dissolved, giving an amber-colored solution. This solution is reduced in volume by rotary evaporation. The resulting dry foam is dissolved in approximately 500 mL of boiling toluene and placed in a large, insulated, dewar flask to slowly cool. The resulting crystals are recovered by filtration after cooling overnight, and recrystallized twice using the same procedure. Following the final recrystallization, the crystals are dried under reduced pressure to yield 9.789 g (47 percent of theoretical) of (R)-pyridinemethanamine, N-[2,6-bis(1-methylethyl)phenyl]-α-[2-(1-methyl)phenyl]-6-(1-naphthanlenyl)][(S)-camphorsulfonate]salt as colorless crystals. Identity is confirmed by single crystal X-ray analysis.

To a glass jar equipped with a small magnetic stir-bar are added 7.17 g (7.56 millimoles) of the (R)-2-pyridinemethanamine, N-[2,6-bis(1-methylethyl)phenyl]-α-[2-(1-methyl)phenyl]-6-(1-naphthanlenyl)][(S)-camphorsulfonate]salt and 25 mL of $CH_2Cl_2$. A solution of 1.5 g (10 millimoles) of KOH in 25 mL of $H_2O$ is added. The mixture is stirred for 10 minutes, and then the layers are allowed to separate. The organic layer is washed with water 3 times, dried with anhydrous $MgSO_4$, and the solvent evaporated to give the desired product, (R)-2-pyridinemethanamine, N-[2,6-bis(1-methylethyl)phenyl]-α-[2-(1-methyl)phenyl]-6-(1-naphthanlenyl). Yield, 3.403 g (93 percent of theoretical). The product is determined to be 98.4 percent e.e. by chiral HPLC chromatography.

In a dry box, to a jar containing a polytetrafluoroethylene coated magnetic stir-bar is added 3.0 g (6.2 mmoles) of (R)-2-pyridinemethanamine, N-[2,6-bis(1-methylethyl)phenyl]-α-[2-(1-methyl)phenyl]-6-(1-naphthanlenyl) and 10 mL of dry hexanes. To this solution is added drop wise via syringe 4.0 mL of 1.6 M n-butyl lithium in hexanes (6.2 mmoles). The mixture is stirred for 1 hour, followed by removal of the solvent under reduced pressure. The product is collected on a frit and dried under reduced pressure. The product, (R)-2-pyridinemethanamide, N-[2,6-bis(1-methylethyl)phenyl]-α-[2-(1-methyl)phenyl]-6-(1-naphthanlenyl)lithium, is recovered as a light yellow solid, washed with pentane, and dried under reduced pressure. Yield: 2.69 g (89 percent of theoretical)

To a 100 mL round-bottomed flask containing a magnetic stir bar 2.69 g (5.48 mmoles) of (R)-2-pyridinemethanamide, N-[2,6-bis(1-methylethyl)phenyl]-α-[2-(1-methyl)phenyl]-6-(1-naphthanlenyl)lithium and 50 mL of toluene are combined and stirred until dissolved. To this solution is added 2.069 g (5.48 mmoles) of $HfCl_4(DME)$ and the mixture is heated to reflux. After 3 hours of reflux, the solution is cooled, 5.9 mL of 3.0 M MeMgBr in $Et_2O$ (19.19 mmoles) are added, and the mixture allowed to stir for 3 hours. The solvent is removed, and the solid extracted with toluene, filtered through diatomaceous earth filter aid, and the toluene removed under reduced pressure to give the desired product as a light yellow solid. Yield: 2.70 g (71 percent of theoretical)

Cocatalyst—methylalumoxane (MAO) (EURECEN™ AL 5100-10T, available commercially from Crompton Corporation).

Shuttling agent—trimethylaluminum (TMA) present in MAO in an amount of approximately 33 mole percent as determined by $^1H$ NMR.

Propylene Polymerization Conditions

Propylene is polymerized in a batch reactor at 70° C. in difluorobenzene (∈=14.3). Propylene is supplied on demand to maintain the concentration in the reactor at 0.24 M. The reaction is terminated by addition of methanol at low yield to avoid mass transfer effects in viscous solutions and maintain concentration of shuttling agent nearly constant. Results are contained in Table 1.

TABLE 1

| Ex. | Complex | Hf (μmol) | MAO (mmol) | Al(CH₃)₃ (mmol) | Time, (min.) | Yield (g) | Mw/Mn | Mn (×10³) |
|---|---|---|---|---|---|---|---|---|
| A* | Rac-1 | 5.0 | 1.20 | 0.6 | 11 | 1.0 | 1.1 | 1.5 |
| 1 | R-1 | 5.0 | 1.20 | 0.6 | 9 | 1.1 | 1.1 | 1.7 |

*comparative, not an example of the invention

Figure 2:
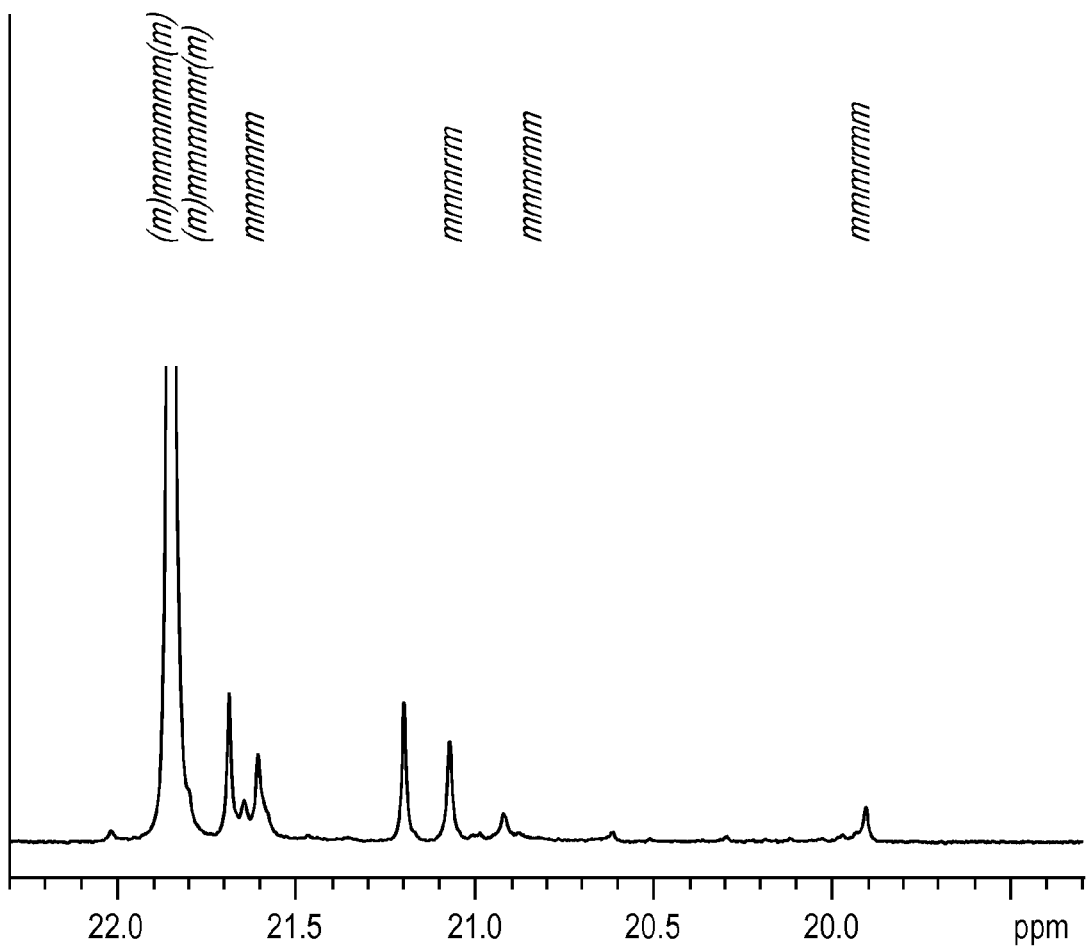
FIG. 2 is the $^{13}C$ NMR spectrum of polymer prepared according to Example 1.

The experiment is designed to determine whether the resulting polymer may be distinguished as a result of using exclusively the R-enantiomer rather than a racemic mixture, thereby forming longer isotactic polymer sequences with fewer inversions. Because the experiment utilizes different enantiomers of the same metal complex in comparative A, chain shuttling produces a multi-block copolymer in which inversions separate the polymer blocks which otherwise possess identical physical properties, differing only in molecular orientation. The occurrence of such inversions is readily apparent using $^{13}C$ NMR analysis. The spectrum obtained by analysis of the polymer from Comparative A (FIG. 1) possesses several intense sharp peaks, especially at 20.85 ppm, due to $m_x(r)m_y$ stereosequences. The corresponding spectrum of the polymer of Example 1, prepared from the substantially pure R-enantiomer, is lacking in such peaks (FIG. 2).

Based on the foregoing results, it may be predicted that the polymer prepared in the presence of multiple catalysts, at least one of which is a non-racemic mixture of enantiomers, and a shuttling agent, will possess fewer inversions than one prepared using a racemic mixture of such enantiomers. The data further demonstrate that a high molecular weight, narrow molecular weight distribution tactic polymer may be formed in high efficiency by use of a metal complex comprised of an excess of one enantiomer rather than a racemic mixture thereof, and the polymerization is conducted in the presence of a polar, aprotic solvent having a dielectric constant, ∈, greater than 2.4, such as difluorobenzene.

The invention claimed is:

1. A process for forming a multi-block copolymer, said copolymer containing therein two or more chemically distinguishable segments or blocks, at least one of which comprises a tactic polymer, the process comprising polymerizing one or more olefin monomers, at least one of which is capable of forming a tactic polymer, in the presence of a chain shuttling agent and a catalyst composition comprising:

two or more olefin polymerization catalysts capable of preparing polymers having differing chemical or physical properties under equivalent polymerization conditions, or at least one olefin polymerization catalyst containing multiple active catalyst sites capable of preparing polymers having differing chemical or physical properties;

characterized in that at least one of the olefin polymerization catalysts comprises a metal complex containing at least one asymmetrically substituted (chiral) carbon atom, said metal complex being present in the form of a non-racemic mixture of the R- and S- enantiomers thereof.

2. A process according to claim 1 wherein the compound containing a chiral carbon atom corresponds to the formula:

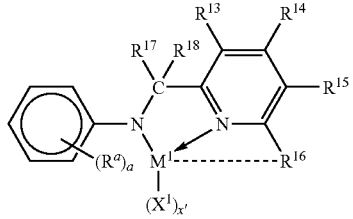

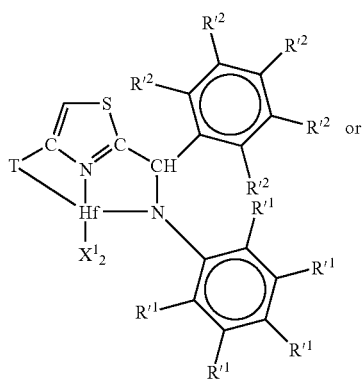

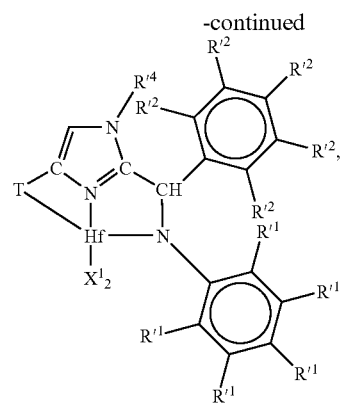

wherein $M^1$ is a Group 4 metal;

$X^1$ is an anionic, neutral or dianionic ligand group;

x' is a number from 0 to 5 indicating the number of such $X^1$ groups $R^{13}, R^{14}, R^{16}$ are hydrogen, halo, or an alkyl, cycloalkyl, heteroalkyl, heterocycloalkyl, aryl, or silyl group of up to 20 atoms not counting hydrogen, or adjacent $R^{13}, R^{14}, R^{15} R^{16}$ groups may be joined together thereby forming fused ring derivatives;

$R^a$ independently each occurrence is $C_{1-4}$ alkyl, and a is 1-5;

$R^{17}$ and $R^{18}$ are different ligand groups selected from hydrogen, halogen, or a $C_{1-20}$ alkyl or aryl group, thereby resulting in an asymmetrically substituted carbon center;

T is a cycloaliphatic or aromatic group containing one or more rings;

$R'^1$ independently each occurrence is hydrogen, halogen, or a univalent, polyatomic anionic ligand, or two or more $R'^1$ groups are joined together thereby forming a polyvalent fused ring system;

$R'^2$ independently each occurrence is hydrogen, halogen, or a univalent, polyatomic anionic ligand, or two or more $R'^2$ groups are joined together thereby forming a polyvalent fused ring system; and $R'^4$ is hydrogen, alkyl, aryl, aralkyl, trihydrocarbylsilyl, or trihydrocarbylsilylmethyl of from 1 to 20 carbons.

3. A process according to claim 1 wherein the compound containing a chiral center is selected from:

[N-(2,6-di(1-methylethyl)phenyl)amido)(o-tolyl)(α-naphthalen-2-diyl(6-pyridin-2-diyl)methane)]hafnium dimethyl;

[N-(2,6-di(1-methylethyl)phenyl)amido)(o-tolyl)(α-naphthalen-2-diyl(6-pyridin-2-diyl)methane)]hafnium di(N,N-dimethylamido);

[N-(2,6-di(1-methylethyl)phenyl)amido)(o-tolyl)(α-naphthalen-2-diyl(6-pyridin-2-diyl)methane)]hafnium dichloride;

[N-(2,6-di(1-methylethyl)phenyl)amido)(2-isopropylphenyl)(α-naphthalen-2-diyl(6-pyridin-2-diyl)methane)] hafnium dimethyl;

[N-(2,6-di(1-methylethyl)phenyl)amido)(2-isopropylphenyl)(α-naphthalen-2-diyl(6-pyridin-2-diyl)methane)] hafnium di(N,N-dimethylamido);

[N-(2,6-di(1-methylethyl)phenyl)amido)(2-isopropylphenyl)(α-naphthalen-2-diyl(6-pyridin-2-diyl)methane)] hafnium dichloride;

[N-(2,6-di(1-methylethyl)phenyl)amido)(phenanthren-5-yl)(α-naphthalen-2-diyl(6-pyridin-2-diyl)methane)] hafnium dimethyl;

[N-(2,6-di(1-methylethyl)phenyl)amido)(phenanthren-5-yl)(α-naphthalen-2-diyl(6-pyridin-2-diyl)methane)] hafnium di(N,N-dimethylamido);

[N-(2,6-di(1-methylethyl)phenyl)amido)(phenanthren-5-yl)(a-naphthalen-2-diyl(6-pyridin-2-diyl)methane)] hafnium dichloride;

hafnium, [N-[2,6-bis(1-methylethyl)phenyl]-α-[2,4, 6-tri(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$]di(methyl), hafnium, [N-[2,6-bis(1-methylethyl)phenyl]-α-[2,6-di(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$]di(methyl), hafnium, [N-[2,6-bis(1-methylethyl)phenyl]-α-[2,4, 6-tri(1-methylethyl)phenyl]-5-(carbazol-1-yl-κ-$C^2$)-2-(N'-methyl)imidazol-2-yl)methanaminato (2-)-κ$N^1$, κ$N^2$]di(methyl), hafnium, [N-[2,6-bis (1-methylethyl)phenyl]-α-[2,4,6-tri(1-methylethyl)phenyl]-5-(2-ethylbenzofuran-3-yl-κ-$C^4$)-2-(N'-methyl)imidazol-2-yl)methanaminato (2-)-κ$N^1$, κ$N^2$]di(benzyl), hafnium, [N-[2,6-bis (1-methylethyl)phenyl]-α-[2,6-di(1-methylethyl)phenyl]-5-(2-ethylbenzofuran-3-yl-κ-$C^4$)-2-(N'methyl)imidazol-2-yl)methanaminato (2-)-κ$N^1$, κ$N^2$]di(benzyl), hafnium, [N-[2,6-bis (1-methylethyl)phenyl]-α-[2,4,6-tri(1-methylethyl)phenyl]-5-(carbazol-1-yl-κ-$C^2$)-2-(N'-methyl)imidazol-2-yl)methanaminato (2-)-κ$N^1$, κ$N^2$]di(benzyl), and hafnium, [N-[2,6-bis (1-methylethyl)phenyl]-α- [2,6-di(1-methylethyl)phenyl]-5-(carbazol-1-yl-κ-$C^2$)-2-(N'methyl)imidazol-2-yl)methanaminato (2-)-κ$N^1$, κ$N^2$]di(methyl).

4. A process according to claim 1 wherein propylene is polymerized or copolymerized with ethylene, one or more $C_{4-8}$ α-olefins, and/or a conjugated or non-conjugated diene.

5. A process according to claim 1 wherein the polymerization is conducted in the presence of a polar, aprotic compound.

6. A process according to claim 5 wherein the polar, aprotic compound is selected from the group consisting of o-xylene, ethylbenzene, 1,2,3-trimethylbenzene, 1,2,4-trimethylbenzene, 1,3,5-trimethylbenzene, isopropylbenzene, 1-methyl-2-ethylbenzene, 1,2-diethylbenzene, chlorobenzene, o-dichlorobenzene, chlorotoluene, 1-chloroethane, dichloromethane, 1,2-dichloroethane, 1-chloroethene, 1-chloropropane, 1,1-dichloroethane, 1-chlorobutane, 1-chloropentane, 1-chlorohexane, 1,1,1-trifluoroethane, difluoromethane, trifluoromethane, 1,1-difluoroethane, 1,1,1-triflurorethane, 1,1,1,2-tetrafluoroethane,1,1,1-trifluoropropane, 1,1,1-trifluorobutane, 1,1,1-trifluoropentane, 1,1,1-trifluorohexane, 1,1,1,3,3-pentafluoropropane, 1,1,1,3,3-pentafluorobutane, fluorocyclobutane, difluorocyclobutane, trifluorocyclobutane, pentafluorocyclobutane, fluorocyclohexane, 1,2-difluorocyclohexane,1,3-difluorocyclohexane, fluorobenzene, o-difluorobenzene, m-difluorobenzene, p-difluorobenzene, fluorotoluene, difluorotoluene, 1-chloro-1-fluoroethane, 1,2-dichlorofluroethane, dichlorofluoromethane, difluorochloromethane, 2-trifluoromethylpropane, tetrahydrofuran, methyl t-butyl ether, 2-butanone, diethylether, 1,2-dimethoxyethane, ethylene glycol dibutyl ether; diethylene glycol dimethyl ether, diethylene glycol dibutyl ether, dichloromethane, 1,4-dioxane, chloroform, sulfolane, dimethylformamide, and dimethylether.

7. A process according to claim 1 which is a continuous, solution polymerization.

8. A process according to claim 1 conducted at a temperature from 70 to 200° C.

9. A process according to claim 1 wherein the shuttling agent is a trihydrocarbyl aluminum or dihydrocarbyl zinc-compound containing from 1 to 12 carbons in each hydrocarbyl group.

10. A process according to any one of claims 1-9 wherein the metal complex is present in the form of the substantially pure R- or S-enantiomer thereof.

11. A process for forming a multi-block copolymer, said copolymer containing therein two or more chemically distinguishable segments or blocks, at least one of which comprises a tactic polymer, the process comprising polymerizing one or more olefin monomers, at least one of which is capable of forming a tactic polymer, in the presence of a chain shuttling agent and a catalyst composition comprising:

two or more olefin polymerization catalysts capable of preparing polymers having differing chemical or physical properties under equivalent polymerization conditions, or at least one olefin polymerization catalyst containing multiple active catalyst sites capable of preparing polymers having differing chemical or physical properties;

characterized in that at least one of the olefin polymerization catalysts comprises a metal complex containing at least one asymmetrically substituted carbon atom, said metal complex being present in the form of a non-racemic mixture of the R- or S-enantiomers thereof.

12. A process according to claim 11 wherein the metal complex is present in the form of the substantially pure R- or S-enantiomer thereof.

13. A process for forming a tactic polymer, the process comprising polymerizing one or more olefin monomers, at least one of which is capable of forming a tactic polymer in the presence of a chain shuttling agent and a catalyst composition comprising a metal complex containing multiple active catalyst sites capable of preparing polymers having differing chemical or physical properties, characterized in that the metal complex contains at least one asymmetrically substituted carbon atom, said metal complex being present in the form of a non-racemic mixture of the R- or S-enantiomers thereof.

14. A process according to claim 13 wherein the metal complex is present in the form of the substantially pure R- or S-enantiomer thereof.

15. A process according to claim 13 or 14 wherein the polymerization is conducted in a polar, aprotic, organic liquid having a dielectric constant greater than 2.4.

16. A process according to claims 15 wherein the polar, aprotic organic liquid is selected from the group consisting of o-xylene, ethylbenzene, 1,2,3-trimethylbenzene, 1,2,4-trimethylbenzene, 1,3,5-trimethylbenzene, isopropylbenzene, 1-methyl-2-ethylbenzene, 1,2-diethylbenzene, chlorobenzene, o-dichlorobenzene, chlorotoluene, 1-chloroethane, dichloromethane, 1,2-dichloroethane, 1-chloroethene, 1-chloropropane, 1,1-dichloroethane,1-chlorobutane, 1-chloropentane, 1-chlorohexane, 1,1,1-trifluoroethane, difluoromethane, trifluoromethane, 1,1-difluoroethane, 1,1,1-triflurorethane, 1,1,1,2tetrafluoroethane,1,1,1-trifluoropropane, 1,1,1-trifluorobutane, 1,1,1-trifluoropentane, 1,1,1-trifluorohexane, 1,1,1,3,3-pentafluoropropane, 1,1,1,3,3-pentafluorobutane, fluorocyclobutane, difluorocyclobutane, trifluorocyclobutane, pentafluorocyclobutane, fluorocyclohexane, 1,2-difluorocyclohexane, 1,3-difluorocyclohexane, fluorobenzene, o-difluorobenzene, m-difluorobenzene, p-difluorobenzene, fluorotoluene, difluorotoluene, 1-chloro-1-fluoroethane, 1,2-dichloroflurorethane, dichlorofluoromethane, difluorochloromethane, 2-trifluoromethylpropane, tetrahydrofuran, methyl t-butyl ether, 2-butanone, diethylether, 1,2-dimethoxyethane, ethylene glycol dibutyl ether; diethylene glycol dimethyl ether, diethylene glycol dibutyl ether, dichloromethane, 1,4-dioxane, chloroform, sulfolane, dimethylformamide, and dimethylether.

* * * * *